United States Patent [19]

Sakamoto et al.

[11] Patent Number: 4,829,134
[45] Date of Patent: May 9, 1989

[54] EPOXY RESIN COMPOSITION

[75] Inventors: Tsuguo Sakamoto, Tokyo; Kazuhiko Kurematsu, Atsugi; Yukihiro Mikogami, Yokohama; Shuichi Suzuki, Yokohama; Cao M. Thai, Yokohama, all of Japan

[73] Assignee: Kabushiki Kaisha Toshiba, Kawasaki, Japan

[21] Appl. No.: 84,085

[22] Filed: Aug. 11, 1987

[30] Foreign Application Priority Data

Jul. 24, 1987 [JP]  Japan .................................. 62-184825

[51] Int. Cl.$^4$ .................. C08G 59/18; C08L 63/00
[52] U.S. Cl. .................................. 525/523; 525/410; 525/507; 528/406
[58] Field of Search ................. 528/403, 406; 525/410, 525/523, 507

[56] References Cited

U.S. PATENT DOCUMENTS

| | | | |
|---|---|---|---|
| 3,670,046 | 6/1972 | Tomalia et al. | 525/523 |
| 4,376,844 | 5/1983 | Emmons et al. | 525/523 |
| 4,474,942 | 10/1984 | Sano et al. | 528/363 |
| 4,499,219 | 2/1985 | Buxbaum et al. | 524/94 |
| 4,678,833 | 7/1987 | McCready et al. | 525/903 |

FOREIGN PATENT DOCUMENTS 51-111239  10/1976  Japan .

OTHER PUBLICATIONS

*Handbook of Epoxy Resins* H. Lee and K. Neville, McGraw-Hill Book Co., 1967, Ch. 9–12, 14 and pp. 22–58 to 22–65.
Liebigs Ann. Chem., vol. 698, (1966) pp. 174–175.

*Primary Examiner*—Lewis T. Jacobs
*Assistant Examiner*—Susan Berman
*Attorney, Agent, or Firm*—Oblon, Fisher, Spivak, McClelland & Maier

[57] ABSTRACT

An epoxy resin composition containing an oxazoline compound in an epoxy resin.

12 Claims, No Drawings

EPOXY RESIN COMPOSITION

BACKGROUND OF THE INVENTION (i) Field of the Invention

The present invention relates to an epoxy resin composition.

(ii) Description of the Prior Art

Epoxy resin has good electrical, mechanical, and physical characteristics and have been widely used as a material for forming electric and electronic equipment and components, an insulating material, and a sealing material.

However, epoxy resin does not have good tenacity and is not satisfactory as a material for a large structure or a thin-wall structure, or a material used together with another material (e.g., a metal) having a thermal expansion coefficient different from that of epoxy resin. In particular, in castable epoxy resin used in a variety of applications as an electrical insulating material, a demand has arisen for improved impact resistance, i.e., cracking resistance and mechanical strength (tenacity or toughness) as well as improved electrical characteristics and heat resistance.

SUMMARY OF THE INVENTION

It is, therefore, an object of the present invention to provide an expoxy resin composition having excellent tenacity or toughness.

The present inventors made extensive studies to solve the above conventional problems and found that when an oxazoline compound is mixed with epoxy resin and the resultant mixture is cured, epoxy resin having excellent tenacity can be prepared, thereby achieving the present invention.

DETAILED DESCRIPTION OF THE PREFERRED EMBODIMENTS

An epoxy resin used in the present invention is any known epoxy compound. Examples of the epoxy resin are a bisphenol A epoxy resin, a bisphenol S epoxy resin, a bisphenol K epoxy resin, a bisphenol F epoxy resin, a phenol-novolak epoxy resin, a crezol-novolak epoxy resin, an alicyclic epoxy resin, a heterocyclic-containing epoxy resin (e.g., triglycidylisocyanate or hidantoin epoxy), a hydrogenated bisphenol A epoxy resin, an aliphatic epoxy resin (e.g., propyleneglycoldiglycidyl ether or pentaerythritolpolyglycidyl ether), an epoxy resin prepared by a chemical reaction between epichlorohydrin and an aromatic, aliphatic or alicyclic carboxylic acid, a spiro ring-containing epoxy resin, a glycidyl ether epoxy resin as a reaction product of an o-allylphenol-novolak compound and epichlorohydrin, a glycidyl ether epoxy resin as a reaction product of epichlorohydrin and a diallylbisphenol compound having an allyl group at the ortho position of each hydroxyl group of bisphenol A, an ethylene oxide, a propylene oxide, a styrene oxide, a cyclohexene oxide, and a phenylglycidyl ether. These epoxy resins can be used singly or as a mixture containing at least two epoxy resins.

The oxazoline compound mixed with the epoxy resin is compound having at least one oxazoline ring in the moleule and is not limited to a specific compound. A bis(2-oxazoline) compound is preferable. Examples of the oxazoline compound are an oxazoline compound having an alkyl group bonded to an oxazoline ring (e.g., 1,2-bis(2-oxazolinyl-2)ethane, 1,4-bis(2-oxazolinyl-2) butane, 1,6-bis(2-oxazolinyl-2)hexane, 1,8-bis(2-oxazolinyl-2)octane, or 1,4-bis(2-oxazolinyl-2) cyclohexane); and an oxazoline compound having an aromatic nucleus bonded to an oxazoline ring (e.g., 1,2-bis(2-oxazolinyl-2)benzene, 1,3-bis(2-oxazolinyl-2) benzene, 1,4-bis(2-oxazolinyl-2)benzene, 5,5'-dimethyl-2,2'-bis(2-oxazolinyl-2)benzene, 4,4,4',4'-tetramethyl-2,2'-bis(2-oxazolinyl-2)benzene, 1,3-bis(5-methyl-2-oxazolinyl-2)benzene, or 1,4-bis(5-methyl-2-oxazolinyl-2) benzene). These oxazoline compounds can be represented by the following general formula:

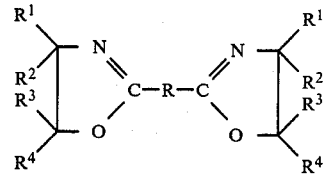

(wherein R is a divalent hydrocarbon group, and each of $R^1$ to $R^4$ is independently a hydrogen atom or a hydrocarbon group.)

Further 2,2'-bis(2-oxazoline), 2,2'-bis(4-methyl-2-oxazoline), 2,2'-bis(5-methyl-2-oxazoline), or the like may be used as the oxazoline compound.

The oxazoline compounds can be used singly or as a mixture containing at least two oxazoline compounds in the present invention.

The oxazoline compound is preferably used in an amount of 0.1 to 1.2 equivalents of the oxazoline ring per equivalent of the oxirane ring of the epoxy resin. If the equivalent of the oxazoline compound is less than 0.1, satisfactory heat resistance (heat deformation resistance) cannot be obtained. However, if the equivalent exceeds 1.2, the electrical characteristics of the cured product tend to be degraded.

A curing agent and/or a curing catalyst may be mixed in the epoxy resin composition of the present invention. The curing agent is directly involved in a reaction (curing) between the epoxy resin and the oxazoline compound and introduced in the resultant polymer skelton or structure. The curing catalyst is not directly involved in a reaction between the epoxy resin and the oxazoline compound but accelerates a chemical reaction therebetween. The curing catalyst is not thus introduced in the resultant polymer skelton.

Examples of the curing agent are an organic acid (e.g., carboxylic acid or sulfonic acid), an acid anhydride, a sulfonate ester, an organic hydroxy compound, and an amine compound excluding tertiary amine.

Examples of the organic carboxylic acid are acetic acid, oxalic acid, formic acid, tartaric acid, malonic acid, malic acid, succinic acid, fumaric acid, maleic acid, glutaric, adipic acid, pimelic acid, suberic acid, azelaic acid, sebacic acid, phthalic acid, salicylic acid, benzoic acid, pyromellitic acid, naphthalenecaboxylic acid, benzophenontetracarboxylic acid, trimellitic acid, nadic acid, and hexahydrophthalic acid. These organic carboxylic acids may be used singly or as a mixture of at least two organic carboxylic acids.

Examples of the sulfonic acid and its ester are: benzenesulfonic acid, toluenesulfonic acid, nitrobenzenesulfonic acid, ethylbenzenesulfonic acid, and dichloro-p-xylenesulfonic acid; and methyl, propyl, isopropyl, butyl or phenyl esters of these sulfonic acids. The sulfonic acids and their esters may be used singly or as a mixture containing at least two of these.

Examples of the acid anhydride are phthalic anhydride, hexahydrophthalic anhydride, methyltetrahydrophthalic anhydride, methylhexahydrophthalic anhydride, nadic anhydride, methylnadic anhydride, chlorendic anhydride, dodecenylsuccinic anhydride, methylsuccinic anhydride, benzophenotetracarboxylic anhydride, pyromellitic anhydride, and maleic anhydride. These acid anhydrides may be used singly or as a mixture of at least two acid anhydrides.

Examples of the organic hydroxy compound are phenol, resorcinol, cresol, halogenated phenol, picric acid, hydroquinone, pyrocatechol, aminophenol, 4,4'-dihydroxydiphenylpropane, 4,4'-dihydroxydiphenylmethane, 3,3'-dihydroxydiphenylpropane, 4,4'-dihydroxydiphenyl ether, 4,4'-dihydroxydiphenylsulfide, 2,4'-dihydroxydiphenylsulfone, 4,4'-dihydroxy-2,2'-dimethyldiphenyl ether, 4,4'-dihydroxydiphenyl ethane, 4,4'-dihydroxydiphenyl ketone, 2-allylphenol, and 2-acrylcresol. These organic hydroxy compounds may be used singly or as a mixture containing at least two organic hydroxy compounds.

The amine compound includes at least one primary amino group and/or at least one secondary amino group in the molecule. Examples of the amine compound are: a chain aliphatic amine such as diethylenetriamine, triethyltetramine, tetraethylenepentamine, dipropylenediamine, diethylaminopropylamine, and hexamethylenediamine; an alicyclic amine such as N-aminoethylpiperazine, menthendiamine, isophoronediamine, 3,3'-dimethyl-4,4'-diaminodicyclohexylmethane, and 1,3-bis-(aminomethyl)cyclohexane; an aliphatic-aromatic amine such as xylylenediamine; and an aromatic amine such as methaphenylenediamine, diaminodiphenylmethane, diaminophenyl ether, and diaminodiphenylsulfone. Other examples of the amine compound are: a polyamide resin such as a reaction product of linolenic acid and ethylenediamine; an adduct of an aliphatic polyamine such as hydroxyethyl-diethylenetriamine, bishydroxyethyldiethylenetriamine, biscyanoethyl-diethylenetriamine, and epoxy resin-diethylenetriamine; ketoimine as a reaction product of aliphatic polyamine and ketone; 3,9-bis(3-aminopropyl)-2,4,8,10-tetraoxaspiro(5,5) undecene; an aromatic-modified polyamine such as methaphenylenediamine-phenylglycidylether adduct, and diaminodiphenylmethane-epoxy resin adduct; an amide compound such as dicyandiamide, adipic dihydrazide, sebacic dihydrazide, dodecane dicarboxylie dihydrazide, tolylenediisocyanato, and diphenylmethaneisocyanato; aminophenol; diaminophenol; and triaminophenol. These amine curing agents may be used as a mixture containing at least two amine curing agents.

The curing agent described above is used in an amount of 0.1 to 1.0 equivalent per equivlent of oxirane ring of the epoxy resin.

Examples of the curing catalyst are tertiary amine, heterocyclic amine, an imidazole compound, a boron trifluoride complex compound, a boron tetrafluoride amine salt, an aromatic or alicyclic sulfonium salt, a quaternary ammonium salt, an organosilane, and an organosiloxane.

Examples of the tertiary amine are tri-2,4,6-dimethylaminomethylphenol, 2-dimethylaminomethylphenol, α-methylbenzyldimethylamine, benzyldimethylamine, triethanolamine, and triethylamine.

Examples of the heterocyclic amine are pyridine, piperidine, and aminoethylpiperazine.

Examples of the imidazole compound are 2-methylimidazole, 2-ethylimidazole, 2-undecylimidazole, 2-heptyldecylimidazole, 2-methyl-4-ethylimidazole, 1-butylimidazole, 1-propyl-2-methylimidazole, 1-benzyl-2-methylimidazole, 1-cyanoethyl-2-undecylimidazole, 1-cyanoethyl-2-phenylimidazole, 1-aziri-2-methylimidazole, 1-aziri-2-ethylimidazole, and 1-aziri-2-undecylimidazole.

Examples of the boron trifluoride complex compound are a boron trifluoride monoethyl amine complex, a boron trifluoride piperidine complex, a boron trifluoride triethanol amine complex, a boron trifluoride-2,4dimethylaniline complex, and a boron trifluoride benzyl-amine complex.

Examples of the boron tetrafluoride amine salt are a boron tetrafluoride triethylamine salt, a boron tetrafluoride monoethylamine salt, a boron tetrafluoride diethyl amine salt, and a boron tetrafluoride n-hexylamine salt.

Examples of the aliphatic or alicyclic sulfonium salt are carboxyethoxyethyltetramethylenesulfoniumhexafluoroarsenate, carboxyethoxyethyltetramethylenesulfoniumhexafluoroantimonate, bis(carbomethoxymethyl) methylsulfoniumhexafluoroarsenate, bis(2-carbomethoxyethyl)methylsulfoniumhexafluoroarsenate, diallylmethylsulfoniumhexafluoroarsenate, and cyanomethyltetramethylenesulfoniumhexafluoroarsenate.

Examples of the quaternary ammonium salt are cetyltrimethylammonium bromide, cetyltrimethylammonium chloride, dodecylmethylammonium iodide, trimethyldodecylammonium chloride, benzyldimethylpalmityammonium chloride, allylcoconuttrimethylammonium bromide, benzyldimethylstearylammonium bromide, stearyltrimethylammonium chloride, and benzyldimethyltetradecylammonium acetylate.

The organosilane or organosiloxane used as the curing catalyst has a hydroxyl or hydrolyzable group directly bonded to the silicon atom in the molecule. Such a material is preferably used together with an organic metal compound (especially an organic aluminum compound) to improve catalytic effect.

Further 1,8-diaza-bicyclo(5,4,0)undecene-7 and its phenol salt, hexoate salt and oleate salt can be used as the curing catalysts. In addition, alkylamineborane, an aromatic borate, or the like may also be used as the curing catalyst.

The curing catalyst described above is used in an amount of 0.05 to 5% by weight of the resin.

The epoxy resin composition of the present invention can be used for casting, molding and impregnation.

(i) When the epoxy resin composition of the present invention is used for casting and molding, a filler is mixed with the epoxy resin composition with or without the addition of the above-mentioned curing agent and/or the above-mentioned curing catalyst. Examples of casting compositions (compositions (A) to (G)) are shown below:

(A) A composition containing:
100 parts by volume of a resin component containing at least
(a) epoxy resin, and
(b) oxazoline compound; and
40 to 200 parts by volume of a filler containing at least
(c) an inorganic fiber having a diameter of less than 3 μm, and
(d) an inorganic powder having an average particle size of 0.05 to 50 μm, a weight ratio of [(c)/{(c)+(d)}] falling within the range of 0.2 to 0.8.

The inorganic fiber improves mechanical strength of the cured product, and examples of such a fiber are a ceramic fiber, an alumina fiber, a boron fiber, a silicon carbide fiber, and a metal whisker.

The type of inorganic powder is not limited to a specific one if it has an average particle size of 0.05 to 50 μm. Examples of the inorganic powder are silia powder, alumina powder, talc powder, calcium carbonate powder, clay powder, aluminum hydroxide powder, barium sulfate powder, and titanium dioxide powder.

In composition (A), a total content of fiber component (c) and powder component (d) is 40 to 200 parts by volume and preferably 100 to 150 parts by volume with respect to 100 parts by volume of resin component [(a)+(b)]. If the total content of components (c) and (d) is less than 40 parts by volume, mechanical strength, cracking resistance, and contraction resistance cannot be satisfactorily improved. However, if the total content exceeds 200 parts by volume, the viscosity of the composition is excessively high, resulting in inconvenience during casting.

A weight mixing ratio (c)/{(c) +(d)} of fiber component (c) with respect to the total weight of fiber and powder components (c) and (d) falls within the range of 0.2 to 0.8 and preferably 0.5 to 0.7. From the physical viewpoints such as mechanical strength, cracking resistance, and contraction resistance of the cured product prepared by casting the composition, the content of component (c) is preferably large. However, if the ratio exceeds 0.8, the viscosity of the composition is excessively increased, resulting in inconvenience during casting. However, if the ratio is less than 0.2, the effect obtained by adding component (c) is degraded. Therefore, the physical properties of the composition are not much improved and the viscosity thereof is excessively increased, resulting in casting inconvenience.

An additional filler (having a particle size larger than that of component (d)) such as silica powder, alumina powder, talc powder, calcium carbonate powder, clay powder, and titanium dioxide powder which are used in conventional costing epoxy resin components; an organic or inorganic coloring agent; and a surface treatment agent such as a silane coupling agent may be added to composition (A) without impairing the effects of the present invention as needed.

Composition (A) can be prepared by a conventional resin composition preparation method. For example, the respective components in predetermined amounts are charged in a mixer such as a universal mixer and are mixed and stirred to obtain the composition. The resultant epoxy resin composition is sufficiently mixed and deaerated and is then poured in molds. The composition is heated and cured at, for example, 150° C. for 15 hours to prepare a cured product.

(A') A composition containing
100 parts by volume of a resin component containing at least
  (a) epoxy resin, and
  (b) oxazoline compound; and
40 to 200 parts by volume of a filler containing at least
  (c) an in organic fiber having a diameter of 3 to 20 μm and a length of 10 to 300 μm, and
  (d) an in organic powder having an average particle size of 0.5 μm or more and a particle size distribution such that particles of 10 μm or less is present in an amount of 90% by weight or more and particles of 5 μm or less is present in an amount of 50% by weight or more.

Component (c) is an inorganic fiber having a diameter of 3 to 20 μm and a length of 3 to 300 μm. Preferably, the fiber has an aspect ratio (diameter/length) of 3 to 15. Examples of the inorganic fiber are Milled Fiber (tradename) available from Asahi Galss Co. Ltd., Microglass Surface Strand (tradename) available from Nippon Sheet Glass Co., Ltd., Glass Cut Fiber (tradename) available from Fuji Fiber Glass K.K., an alumina fiber, a boron fiber, a silicon carbide fiber, and a metal whisker.

Component (d) is an inorganic powder having an average particle size of 0.5 μm or more, and a particle size distribution such that particles of 10 μm or less is 90% by weight or more and particles of 5 μm or less is 50% by weight or more. Examples of the inorganic powder are silica, alumina, talc, carcium carbonate, clay, aluminum hydroxide, barium sulfate, and titanium dioxide powders.

In composition (A'), a total content of fiber component (c) and powder component (d) is 40 to 200 parts by volume and preferably 100 to 150 parts by volume with respect to 100 parts by volume of resin component [(a)+(b)], as in composition (A). If the total content of components (c) and (d) is less than 40 parts by volume, mechanical strength, cracking resistance, and contraction resistance cannot be satisfactorily improved. However, if the total content exceeds 200 parts by volume, the viscosity of the composition is excessively high, resulting in inconvenience during casting.

A weight mixing ratio (c)/{(c)+(d)} of fiber component (c) with respect to the total weight of fiber and powder components (c) and (d) falls within the range of 0.2 to 0.8 and preferably 0.5 to 0.7. From the physical viewpoints such as mechanical strength, cracking resistance, and contraction resistance of the cured product prepared by casting the composition, the content of component (c) is preferably large. However, if the ratio exceeds 0.8, the viscosity of the composition is excessively increased, resulting in inconvenience during casting. However, if the ratio is less than 0.2, the effect obtained by adding component (c) is degraded. Therefore, the physical properties of the composition are not much improved and the viscosity thereof is excessively increased, resulting in casting inconvenience.

An additional filler (having a particle size larger than that of component (d)) such as silica powder, alumina powder, talc powder, calcium carbonate powder, clay powder, and titanium dioxide powder which are used in conventional casting epoxy resin components; an organic or inorganic coloring agent; and a surface treatment agent such as a silane coupling agent may be added to composition (A) without impairing the effects of the present invention as needed.

Further carboxylic and/or phenolic curing agents may be added to composition (A'), in an amount of up to 0.5 equivalents, preferably 0.3 equivalents, per equivalent of epoxy resin.

(B) A composition containing
  (a) epoxy resin,
  (b) oxazoline compound,
  (c) curing catalyst, and
  (d) a filler.

Filler (d) includes an inorganic particulate filler and a fibrous filler. The inorganic particulate filler has an average particle size of 0.05 to 50 μm. The average particle size preferably falls within the range of 0.1 to 30 μm. Examples of the inorganic filler are silica particles, alumina particles, hydrated alumina particles, calcium carbonate particles, barium sulfate particles, titanium dioxide particles, silicon nitride particles, aluminium nitride particles, silicon carbide particles, magnesium oxide particles, beryllium oxide particles, kaolin particles, and mica particles.

The diameter of the fibrous filler preferably falls within the range of 0.1 to 20 μm, and its average length preferably falls within the range of 1.5 to 15 mm. Examples of the fibrous filler are: an inorganic fiber such as a glass fiber, a carbon fiber, asbestos, alumina fiber, a ceramic powder obtained by synthesizing alumina and silica, a boron fiber, a zirconia fiber, and a metal fiber; a synthetic fiber such as a polyester fiber, an aramide fiber, a nylon fiber, and a phenol fiber; other organic fibers; and animal/plant fibers. The fibrous fillers may be used singly or in combination.

A total content of filler component (d) falls within the range of 30 to 60% by volume with respect to the total volume of the composition. If the content of component (d) is less than 30% by volume, contraction resistance, cracking resistance, and mechanical strength are not satisfactory. However, if the content of component (d) exceeds 65% by volume, the viscosity of the component is excessively increased, thus degrading workability. The content of filler component (d) preferably falls within the range of 40 to 55% by volume.

(C) A composition prepared by mixing the curing agent to composition (B).

(D) A composition obtained by using an amine curing agent as the curing agent in composition (B).

(E) A composition containing
(a) epoxy resin,
(b) oxazoline compound,
(c) curing catalyst,
(d) particulate filler, and
(e) a fibrous filler.

Particulate filler (d) is the same as that described with reference composition (B).

The fibrous filler is an inorganic or organic fiber. The diameter of the fibrous filler falls within the range of 0.1 to 20 μm and preferably 0.15 to 13 μm, and its average length falls within the range of 1 to 300 μm and preferably 3 to 100 μm. If the diameter and length of the fiber fall outside the above ranges, the viscosity of the composition is undesirably decreased and therefore care must be taken. The type of fibrous filler is not limited if it is of a type normally used to improve mechanical strength or the like of the synthetic resin. Examples of the fibrous filler are Milled Fiber (tradename) available from Asahi Glass Co, Ltd., Microglass Surface Strand (tradename) available from Nippon Sheet Glass Co., Ltd., Glass Cut Fiber (tradename) available from Fuji Fiber Glass K.K., an alumina fiber, a boron fiber, a silicon carbide fiber, a metal whisker, a carbon fiber, and a polyamide fiber.

A total content of components (d) and (e) in composition (E) falls within the range of 40 to 200 parts by volume and preferably 100 to 150 parts by volume with respect to 100 parts by volume of components (a), (b), and (c). If the content of components (d) and (e) is less than 40 parts by volume, mechanical strength, cracking resistance, and contraction resistance are degraded. However, if the content exceeds 200 parts by volume, the viscosity of the component is excessively increased, thus resulting in casting inconvenience.

A volume mixing ratio $(e)/\{(d)+(e)\}$ falls within the range of 0.1 to 0.8 and preferably 0.5 to 0.7. From the viewpoint of physical properties such as mechanical strength, cracking resistance, and contraction resistance of the cured product prepared by casting the composition, the content of component (e) is preferably larger. However, if the mixing ratio exceeds 0.8, the viscosity of the composition is excessively increased, thus resulting in casting inconvenience. If the mixing ratio is less than 0.2, the effect obtained by adding component (e) is degraded. Therefore, the physical properties cannot be much improved, and the viscosity of the composition is excessively increased, resulting in inconvenience.

(F) A composition prepared by mixing the curing agent in composition (E).

(G) A composition prepared by using the amine curing agent in place of the curing catalyst in composition (E).

(ii) When the epoxy resin composition of the present invention is used for impregnation, compositions prepared by not adding filler components to casting/molding compositions (A) to (G) may be used. The impregnation composition can be used as a nonsolvent type (i.e., no solvent is added) composition or can be dissolved in a low-boiling point solvent exemplified by dioxane or tetrahydrofurane.

(iii) When the epoxy resin composition of the present invention is used for a laminate such as a laminate board, fibrous materials are used together with the curing agent and/or the curing catalyst. Examples of laminate compositions are described below.

(H) A composition containing
(a) epoxy resin,
(b) oxazoline compound,
(c) curing catalyst, and
(d) a fibrous material selected from the group consisting of a roving fabric, cloth, and an nonwoven fabric.

Examples of the fibrous material are a roving fabric, cloth, or an nonwoven fabric of an organic fiber, a glass fiber, a carbon fiber, a ceramic fiber, or the like. Examples of the organic fiber are a polyester fiber, an aramide fiber, a nylon fiber, and a phenol fiber. Examples of the glass fiber are an E glass fiber, an S glass (high strength) fiber, and a Yll-3A (high elasticity) fiber. Examples of the carbon fiber are a flame-resistant fiber, a carbon-based fiber, and a graphite fiber. Examples of the ceramic fiber are a zirconia fiber, an alumina fiber, and a ceramic fiber containing alumina and silica as major constituents. The surfaces of these fibers may be treated with a coupling agent such as a silane coupling agent, as needed.

The content of fibrous material (d) falls within the range of 10 to 80% by weight and preferably 20 to 70% by weight with respect to the total content of components (a), (b), (c), and (d).

(I) A composition prepared by mixing a curing agent to composition (G).

(J) A composition prepared by using the amine curing agent in place of component (c) in composition (G).

(iv) The following composition (K) is suitable in the field requiring heat resistance. This composition is most suitable for a bind tape.

(K) A composition containing
(a) epoxy resin,
(b) oxazoline compound,
(c) organic acid curing catalyst, and
(d) polyvinylformal.

Organic acid curing catalyst (c) includes the above-mentioned carboxylic acids and phenol compounds.

When composition (K) is applied to glass roving, polyvinylformal removes the flowing solvent at a low temperature and improves adhesion strength between glass roving components of a B stage bind tape. During heating and curing, if the composition includes only epoxy resin and the curing catalyst, the viscosity of the resin is excessively low and the composition may pour and drop to lose the proper amount of resin in the cured product. However, if polyvinylformal (d) is mixed, the above disadvantage can be greatly reduced. The molecular weight of polyvinylformal falls within the range of 20,000 to 100,000 and its formalization percentage is 40% or more. The molecular weight preferably falls within the range of 40,000 to 60,000, and the formalization percentage is preferably 80% or more. The content of polyvinylformal is a maximum of 30% by weight and preferably falls within the range of 3 to 20% by weight in composition (K).

Composition (K) is dissolved in an organic solvent, and the resultant solution is used for practical applications. The organic solvent is selected from the materials having a boiling point of 120° C. or less at room temperature and atmospheric pressure. The boiling point preferably falls within the range of 50 to 110° C. The bind tape is prepared such that a resin is applied in a B stage to glass roving or glass cloth as a base. In this case, when a solvent type paint is used, a volatile fraction of the bind tape is preferably minimized. When the solvent is removed, stability of the B stage of the resin cannot be maintained upon an increase in heating temperature, thus degrading workability. The solvent must be compatible with the resin. For these reasons, a solvent preferably contains 60% by weight of a mixture consisting of 30% by weight of methanol and 70% by weight of dioxane.

(v) A composition having excellent fire retardancy is exemplified by composition (L) below.

(L) A composition containing
(a) epoxy resin,
(b) oxazoline compound,
(c) an acid curing catalyst,
(d) an aluminum hydroxide powder, and
(e) a fibrous inorganic filler.

Acid curing catalyst (c) may be any one of the above-mentioned carboxylic acids and hydroxy compounds.

Aluminum hydroxide component (d) imparts fire retardancy to the resultant composition.

Fibrous filler (e) improves mechanical strength and may be exemplified by ones described with reference to composition (E).

A total content of aluminum hydroxide (d) and filler (e) falls within the range of 30 to 65% by volume with respect to the total volume of the composition. If the content of components (d) and (e) is less than 30% by volume, contraction resistance, cracking resistance, and mechanical strength are not satisfactory. However, if the content exceeds 65% by volume, the viscosity of the composition is excessively increased, thereby degrading workability. The content of components (d) and (e) preferably falls within the range of 40 to 55% by volume. A volume mixing ratio of component (e) to component (d) falls within the range of 0.1 to 0.9. When the mixing ratio falls outside the above range, the effect of lowering the viscosity is slightly decreased. In order to decrease the viscosity, the mixing ratio preferably falls within the range of 0.4 to 0.65.

Various coloring agents can be mixed in the above mentioned compositions, including an azo- or anthraquinone-based cationic dye, a metal-containing dye having a sulfone group or an alkylsulfone group, an organic pigment (e.g., phthalocyanine blue, phthalocyanine green, or quinacridone), and an inorganic pigment (e.g., titanium oxide), as well as a surface treatment agent such as a silane coupling agent (e.g., $\gamma$-glycidoxypropyltrimethoxysilane), a titanate coupling agent (e.g., isopropyltriisostearoyltitanate), and a zirconium-aluminum coupling agent.

EXAMPLES 1-8

Bisphenol A-diglycidylether epoxy resin (Epicoat 828 available from Shell Chemical Co.; epoxy equivalent: 180) as an epoxy resin, 2,2'-(1,3-phenylene)bis (2-oxazoline) (CP Resin available from Takeda Chemical Industries, Ltd.; molecular weight: 216), adipic acid, ceramic fibers (Fiber Flux Milled Fiber available from Toshiba MonoFlux K.K.), and an inorganic powder (5×(tradename) as crystalline silica available from Tatsumori K.K.; average particle size: 0.98 $\mu$m) were mixed and stirred by a universal mixer at composition ratios in Tables 1 and 2. The resultant compositions were sufficiently deaerated in vacuum and casted in molds and were heated and cured at 150° C. for 15 hours to prepare samples. The evaluation results of these samples are summarized in Tables 1 and 2.

COMPARATIVE EXAMPLES 1-8

Following the same procedures as in Examples 1 to 8, bisphenol A-diglycidylether epoxy resin (Epicoat 828 available from Shell Chemical Co.; epoxy equivalent weight: 180) as an epoxy resin, HN2200 (available from Hitachi Chemical Co., Ltd.) as a curing agent, N,N-dimethylbenzylamine (DMBA) as a curing accelerator, and silica (average particle size: 10.7 $\mu$m) were used to prepare test samples. In addition, glass fibers and silica were respectively added to resins as in Examples 1 to 8 to prepare compositions in additional comparative examples shown in Tables 2 and 3.

TABLE 1

| | Unit | Example 1 | | 2 | | 3 | | 4 | | 5 | | 6 | |
|---|---|---|---|---|---|---|---|---|---|---|---|---|---|
| Resin Composition | | | | | | | | | | | | | |
| Epicoat 828 | Parts | 100 | 81.9 | 100 | 81.9 | 100 | 78.7 | 100 | 81.9 | 100 | 81.9 | 100 | 69.5 |
| HN-2200 | by | — | | — | | | | | | | | | |
| 2,2'-(1,3-phenylene)-bis(2-oxazoline) | Volume | | 16.4 | | 16.4 | | 15.7 | | 16.4 | | 16.4 | | 27.8 |
| Adipic Acid | | | 1.7 | | 1.7 | | 5.6 | | 1.7 | | 1.7 | | 2.7 |
| Bisphenol A | | — | | — | | | | | | | | | |
| N,N—dimethylbenzylamine (DMBA) | | — | | — | | | | | | | | | |
| Filler | | | | | | | | | | | | | |
| Ceramic Fiber (diameter: 2 $\mu$m; | | 138 | 69 | 138 | 99.7 | 138 | 69 | 80 | 40 | 80 | 90 | 163.4 | 81.7 |

TABLE 1-continued

|  | Unit | Example 1 | Example 2 | Example 3 | Example 4 | Example 5 | Example 6 |
|---|---|---|---|---|---|---|---|
| length: 20 μm) |  |  |  |  |  |  |  |
| Silica (d) (average particle size: 0.98 μm) |  | $\frac{c}{c+d}=$ 0.5 | 69 | $\frac{c}{c+d}=$ 0.72 | 39.3 | $\frac{c}{c+d}=$ 0.5 | 69 | $\frac{c}{c+d}=$ 0.5 | 40 | $\frac{c}{c+d}=$ 0.5 | 90 | $\frac{c}{c+d}=$ 0.72 | 81.7 |
| Silica (average particle size: 10.7 μm) |  |  |  |  |  |  |  |
| Property |  |  |  |  |  |  |  |
| Fluidity[1] | — | ○ | ○ | ○ | ○ | ○ | ◉ |
| Cracking Resistance[2] | — | >11 | >11 | >11 | 2.4 | >11 | >11 |
| Thermal Deformation Temperature[3] | °C. | 151 | >170 | 149 | 128 | >170 | 150 |
| Tensile Strength[4] | kgf/mm² | 12.8 | 13.3 | 12.6 | 9.8 | 13.0 | 12.6 |
| Bending Strength[5] | kgf/mm² | 20.7 | 21.4 | 20.1 | 18.8 | 21.1 | 19.9 |
| Volume Resistivity[6] 160° C. | Ω·cm | 9.7 × 10¹¹ | 9.6 × 10¹¹ | 7.2 × 10¹¹ | 9.8 × 10¹¹ | 9.7 × 10¹¹ | 8.4 × 10¹⁰ |
| Dielectric Constant[7] 160° C. |  | 5.4 | 5.4 | 5.6 | 5.4 | 5.5 | 6.8 |
| Dielectric Dissipation Factor[8] 160° C. | % | 4.2 | 4.1 | 3.8 | 4.3 | 4.2 | 7.8 |

[1]Visual estimation
◉Excellent
○ Good
X Not castable
[2]Olyphant method (Kogyo Zairyo Vol. 129, No. 5, P-59, 1981)
[3][4][5][6][7][8]JISK 6011

TABLE 2

|  | Unit | Example 7 |  | Example 8 |  | Comparative Example 1 |  | Comparative Example 2 |  | Comparative Example 3 |  | Comparative Example 4 |  |
|---|---|---|---|---|---|---|---|---|---|---|---|---|---|
| Resin Composition |  |  |  |  |  |  |  |  |  |  |  |  |  |
| Epicoat 828 | Parts by Volume | 100 | 55.8 | 100 | 93.8 | 100 | 81.9 | 100 | 81.9 | 100 | 55.4 | 100 | 55.4 |
| HN-2200 |  |  | — |  |  |  |  |  |  |  | 44.3 |  | 44.3 |
| 2,2'-(1,3-phenylene)bis(2-oxazoline) |  |  | 40.2 |  | 5.6 |  | 16.4 |  | 16.4 |  | — |  | — |
| Adipic Acid |  |  | 4.0 |  | 0.6 |  | 1.7 |  | 1.7 |  | — |  | — |
| Bisphenol A |  |  | — |  |  |  |  |  |  |  |  |  |  |
| N,N—dimethylbenzylamine (DMBA) |  |  | — |  |  |  |  |  |  |  | 0.28 |  | 0.28 |
| Filler |  |  |  |  |  |  |  |  |  |  |  |  |  |
| Ceramic Fiber (diameter: 2 μm; length 20 μm) |  | 163.4 |  | 81.7 | 163.4 | 81.7 | 138 | 13.8 | 124.2 |  |  | 93 | 46.5 |
| Silica (d) (average particle size: 0.98 μm) |  | $\frac{c}{c+d}=$ 0.5 | 81.7 | $\frac{c}{c+d}=$ 0.5 | 81.7 | $\frac{c}{c+d}=$ 0.1 | 124.2 |  | 13.8 |  |  | $\frac{c}{c+d}=$ 0.5 | 46.5 |
| Silica (average particle size: 10.7 μm) |  |  | — |  | — |  | — |  | — |  | 117 |  | — |
| Property |  |  |  |  |  |  |  |  |  |  |  |  |  |
| Fluidity[1] | — |  | ◉ |  | ◉ |  | ◉ |  | X |  | ◉ |  | ◉ |
| Cracking Resistance[2] | — |  | >11 |  | >11 |  | <1 |  | — |  | 0 |  | 8 |
| Thermal Deformation Temperature[3] | °C. |  | 149 |  | 151 |  | 127 |  | — |  | 126 |  | 127 |
| Tensile Strength[4] | kgf/mm² |  | 12.0 |  | 11.8 |  | 10.8 |  | — |  | 8.4 |  | 9.8 |
| Bending Strength[5] | kgf/mm² |  | 18.6 |  | 19.2 |  | 18.0 |  | — |  | 15.6 |  | 16.0 |
| Volume Resistivity[6] 160° C. | Ω·cm |  | 3.8 × 10⁹ |  | 8.5 × 10¹¹ |  | 6.3 × 10¹¹ |  | — |  | 4.0 × 10¹¹ |  | 4.2 × 10¹¹ |
| Dielectric Constant[7] 160° C. |  |  | 7.7 |  | 4.6 |  | 5.4 |  | — |  | 6.1 |  | 6.0 |
| Dielectric Dissipation Factor[8] 160° C. | % |  | 11.2 |  | 5.4 |  | 4.1 |  | — |  | 3.2 |  | 3.1 |

[1]Visual estimation
◉Excellent
○ Good
X Not castable
[2]Olyphant method (Kogyo Zairyo Vol. 129, No. 5, P-59, 1981)
[3][4][5][6][7][8]JISK 6011

TABLE 3

| | Unit | Comparative Example | | | | | | | |
|---|---|---|---|---|---|---|---|---|---|
| | | 5 | | 6 | | 7 | | 8 | |
| Resin Composition | | | | | | | | | |
| Epicoat 828 | Parts | 100 | 81.7 | 100 | 81.9 | 100 | 81.9 | 100 | 81.9 |
| HN-2200 | by | | — | | | | | | |
| 2,2'-(1,3-phenylene)bis(2-oxazoline) | Volume | | 16.4 | | 16.4 | | 16.4 | | 16.4 |
| Adipic Acid | | | 1.9 | | 1.7 | | 1.7 | | 1.7 |
| Bisphenol A | | | | | | | | | |
| N,N—dimethylbenzylamine (DMBA) | | | | | | | | | |
| Filler | | | | | | | | | |
| Ceramic Fiber (diameter: 2 μm; length: 20 μm) | | 76 | 76 | 115 | | 210 | 105 | 30 | 15 |
| Silica (d) (average particle size: 0.98 μm) | | | | | 115 | $\frac{c}{c+d}=0.5$ | 105 | $\frac{c}{c+d}=0.5$ | 15 |
| Silica (average particle size: 10.7 μm) | | | | | | | | | |
| Property | | | | | | | | | |
| Fluidity[1] | — | | ○ | | ⊙ | X | | ⊙ | |
| Cracking Resistance[2] | — | | <3 | | <1 | — | | <1 | |
| Thermal Deformation Temperature[3] | °C. | | 122 | | 123 | — | | 124 | |
| Tensile Strength[4] | kgf/mm² | | 8.8 | | 10.8 | — | | 9.2 | |
| Bending Strength[5] | kgf/mm² | | 15.8 | | 17.6 | — | | 15.8 | |
| Volume Resistivity[6] | 160° C. Ω·cm | | 8.7 × 10¹ | | 9.6 × 10¹¹ | — | | 9.8 × 10¹¹ | |
| Dielectric Constant[7] | 160° C. | | 5.2 | | 5.3 | — | | 5.6 | |
| Dielectric Dissipation Factor[8] | 160° C. % | | 4.4 | | 4.2 | — | | 4.4 | |

[1]Visual estimation
[2]Olyphant method (Kogyo Zairyo Vol. 129, No. 5, P-59, 1981)
[3][4][5][6][7][8]JISK 6011
⊙ Excellent
○ Good
X Not castable

EXAMPLES 9-4

1,8-diaza-bicyclo(5,4,0)undecene-7(DBU), 1-benzyl-2-methylimidazole, and BF3-monoethylamine as curing catalysts; and a silica powder (5× available from Tatsumori K.K.) and an alumina powder (LA#4000 available from Taiheiyo Random K.K.) as fillers were mixed and stirred by a universal mixer with bisphenol A-diglycidyl ethers (Araldyte GY 260 available from Ciba-Geigy Corp.; epoxy equivalent weight: 190) and (Epicoat 834 available from Shell Chemical Corp.; epoxy equivalent weight: 250) and 2,2'-(1,3-phenylene)-bis(2-oxazoline) (to be referred to as a PBO hereinafter) as epoxy resins at composition ratios shown in Table 4. The resultant compositions were sufficiently deaerated in vacuum and were heated and cured in molds at 150° C. for 15 hours to prepare test samples. The compositions in Examples 9 to 12 were obtained by mixing various curing catalysts and fillers. The compositions in Examples 13 and 14 were prepared within the proper PBO range. The evaluation results of these compositions are summarized in Table 4.

COMPARATIVE EXAMPLES 9-11

A composition in Comparative Example 9 was prepared without using an oxazoline compound (PBO). Compositions in Comparative Examples 10 and 11 were prepared when the contents of PBO fell outside the proper range. Evaluation results are summarized in Table 4.

EXAMPLE 15

Following the same procedures as in Examples 9 to 14, an epoxy resin, PBO, a curing catalyst, a filler, and glass chip strands (Microchop Strand available from Nippon Sheet Glass Co., Ltd.; fiber length: 12 mm) were mixed and kneaded by a kneader at ratios shown in Table 4. Kneaded products were pressed to prepare test samples. Evaluation results are summarized in Table 4.

COMPARATIVE EXAMPLE 12

A composition in Comparative Example 12 was prepared without using PBO. Evaluation results are summarized in Table 4.

As is apparent from Table 4, the compositions in Examples 9 to 15 have higher thermal deformation temperature, cracking resistance, and mechanical strength than those in Comparative Examples 9 to 12. Therefore, the compositions of the examples can be used in a variety of applications as casting/molding resins.

TABLE 4

| | Unit | Example | | | | | | | Comparative Example | | | |
|---|---|---|---|---|---|---|---|---|---|---|---|---|
| | | 9 | 10 | 11 | 12 | 13 | 14 | 15 | 9 | 10 | 11 | 12 |
| Araldyte GY260 | Parts | 100 | 100 | 100 | 100 | 100 | 100 | 60 | 100 | 100 | 100 | 100 |
| Epicoat 834 | by | | | | | | | 40 | | | | 40 |
| PBO | Weight | 30 | 30 | 30 | 30 | 6 | 60 | 30 | | 5 | 80 | |
| DBU | | 2 | | | 2 | | | | 30 | 10 | 10 | 30 |
| 1-benzyl-2-methylimidazole | | | 1 | | | | | | | | | |
| BF3—monoethylamine | | | | 1 | | | | 20 | | | | |
| Silica Powder 5× | | | | | | 300 | | 250 | | | | 250 |
| Alumina Powder LA #4000 | | 500 | 500 | 500 | | 500 | 500 | | 500 | 500 | 500 | |
| Glass Fiber (l = 12 mm) | | | | | | | | 5 | | | | 5 |
| Thermal Deformation Temperature[1] | °C. | 165 | 160 | 170 | 165 | 150 | 155 | 155 | 140 | 125 | 135 | 140 |
| Cracking Resistance[2] | | 5 | 5 | 5 | 6 | 5 | 5 | — | 0 | 1 | 2 | — |

TABLE 4-continued

|  | Unit | Example | | | | | | | Comparative Example | | | |
| --- | --- | --- | --- | --- | --- | --- | --- | --- | --- | --- | --- | --- |
|  |  | 9 | 10 | 11 | 12 | 13 | 14 | 15 | 9 | 10 | 11 | 12 |
| Tensile Strength[3] | kg/mm² | 15 | 14 | 14 | 15 | 14 | 14 | 16 | 12 | 11 | 12 | 14 |

[1)(3)]JIS 6911
[2)]Olyphant method (Kogyo Zairyo Vol. 129, No. 5, P-59, 1981)

EXAMPLES 16–23

Methyltetrahydrophthalic anhydride (HN2200 available from Hitachi Chemical Co., Ltd), fumaric acid and bisphenol A as curing agents; 2,4,6-trisdimethylaminomethylphenol (TDAP), 1,8-diaza-bicyclo(5,4,0)-undecene-7(DBU), 1-benzyldimethylimidazole, and BF3-monoethylamine as curing catalysts; and a silica powder (5× available from Tatsumori K.K.) and an alumina powder (LA#4000 available from Taiheiyo Random K.K.) as fillers were mixed and stirred by a universal mixer with bisphenol A-diglycidyl ethers (Araldyte GY 260 available from Ciba-Geigy Corp.; epoxy equivalent weight: 190) and (Epicoat 834 available from Shell Chemical Corp.; epoxy equivalent weight: 250) and 2,2'-(1,3-phenylene)bis(2-oxazoline) (to be referred to as a PBO hereinafter) as epoxy resins at composition ratios shown in Table 5. The resultant compositions were sufficiently deaerated in vacuum and were heated and cured in molds at 150° C. for 15 hours to prepare test samples. The compositions in Examples 16 to 21 were obtained by mixing various curing agents and catalysts and various fillers. The compositions in Examples 22 and 23 were prepared within the proper PBO range. The evaluation results of these compositions are summarized in Table 5.

COMPARATIVE EXAMPLES 13–15

A composition in Comparative Example 13 was prepared without using an oxazoline compound (PBO). Compositions in Comparative Examples 14 and 15 were prepared when the contents of PBO fell outside the proper range. Evaluation results are summarized in Table 5.

EXAMPLE 24

Following the same procedures as in Examples 16 to 23, an epoxy resin, PBO, a curing catalyst, a filler, and glass chip strands (Microchop Strand available from Nippon Sheet Glass Co., Ltd.; fiber length: 12 mm) were mixed and kneaded by a kneader at ratios shown in Table 5. Kneaded products were pressed to prepare test samples. Evaluation results are summarized in Table 5.

COMPARATIVE EXAMPLE 16

A composition in Comparative Example 16 was prepared without using PBO. Evaluation results are summarized in Table 5.

As is apparent from Table 5, the compositions in Examples 16 to 24 have higher thermal deformation temperature, cracking resistance, and mechanical strength than those in Comparative Examples 13 to 16. Therefore, the compositions of the examples can be used in a variety of applications as casting/molding resins.

TABLE 5

|  | Unit | Example | | | | | | | | | Comparative Example | | | |
| --- | --- | --- | --- | --- | --- | --- | --- | --- | --- | --- | --- | --- | --- | --- |
|  |  | 16 | 17 | 18 | 19 | 20 | 21 | 22 | 23 | 24 | 13 | 14 | 15 | 16 |
| Araldyte GY260 | Parts |  |  |  |  |  |  | 100 | 100 | 60 | 100 | 100 | 100 | 60 |
| Epicoat 834 | by |  |  |  |  |  |  |  |  | 40 |  |  |  | 40 |
| PBO | weight | 30 | 30 | 30 | 30 | 30 | 30 | 6 | 60 | 30 |  | 50 | 80 |  |
| HN2200 |  | 10 | 10 | 10 | 10 |  |  | 10 | 10 | 10 | 80 | 10 | 10 | 80 |
| Fumaric Acid |  |  |  |  |  | 3 |  |  |  |  |  |  |  |  |
| Bisphenol A |  |  |  |  |  |  | 7 |  |  |  |  |  |  |  |
| TDAP |  | 4 |  |  |  |  |  |  |  |  |  |  |  |  |
| BDU |  |  | 2 |  |  | 2 | 2 | 2 | 2 | 2 | 0.5 | 2 | 2 | 0.5 |
| 1-benzyl-2-methylimidazole |  |  |  | 1 |  |  |  |  |  |  |  |  |  |  |
| BF3—monoethylamine |  |  |  |  | 1 |  |  |  |  |  |  |  |  |  |
| Silica Powder 5× |  |  |  |  |  |  |  |  |  | 250 |  |  |  |  |
| Alumina Powder LA #4000 |  | 500 | 500 | 500 | 500 | 500 | 500 | 500 | 500 |  | 500 | 500 | 500 | 500 |
| Glass Fiber (l = 12 mm) |  |  |  |  |  |  |  |  |  | 5 |  |  |  |  |
| Thermal Deformation Temperature[1] | °C. | 160 | 170 | 170 | 165 | 170 | 160 | 150 | 150 | 170 | 130 | 135 | 140 | 120 |
| Cracking Resistance[2] |  | 5 | 5 | 5 | 5 | 4 | 5 | 4 | 5 | 10< | 1 | 1 | 2 | 0 |
| Tensile Strength[3] | kg/mm² | 15 | 14 | 15 | 14 | 16 | 14 | 14 | 15 | 15 | 9 | 10 | 11 | 12 |

[1)(3)]JIS K6911
[2)]Olyphant method (Kogyo Zairyo, Vol. 129, No. 5, P-59, 1981)

EXAMPLES 25–34

Bisphenol A-diglycidyl ether (Epicoat 828 available from Shell Chemical Corp.: epoxy equivalent weight: 190) and 2,2'-(1,3-phenylene)bis(2-oxazoline) (to be referred to as a PBO hereinafter) as epoxy resins; diethylaminopropylamine (DEAPA), diaminodiphenylmethane (DDM), and DDM epoxy resin adduct (Acmex H84 available from Nippon Gosei Kagaku Kogyo K.K.) as amine compounds; a silica powder (5× available from Tatsumori K.K.; particle size: 1 μm) and an alumina powder (LA 4000 available from Taiheiyo Random K.K.; average particle size: 2 μm) as particulate fillers; and ceramic fibers (Fiber Flux available from Toshiba Monoflux K.K.: length: 40 μm), and glass fibers (Glass Milled Fiber REV7 available from Nippon Sheet Glass Co., Ltd.; average thickness: 13 μm and average length: 60 μm) as fibrous fillers were mixed and stirred by a universal mixer at ratios shown in Table 6. The resultant compositions were sufficiently deaerated in vacuum and cured in molds at 150° C. for 15 hours to prepare test samples. Various amine compounds were mixed in the compositions in Examples 25 to 27. The compositions in Examples 28 and 29 were prepared within the proper PBO range. The compositions in Examples 30 to 34 were prepared within the proper ranges of particulate and fibrous fillers. Evaluation results are summarized in Table 6.

COMPARATIVE EXAMPLES 17–23

An oxazoline compound (PBO) was not used in the composition in Comparative Example 17. The PBO range for the compositions in Comparative Examples 18 and 19 was outside the proper range. The ranges of particulate and fibrous fillers for the compositions in Comparative Examples 20 to 23 were outside the proper ranges. Evaluation results are summarized in Table 6.

As is apparent from Table 6, the compositions in Examples 25 to 34 have better fluidity than those in Comparative Examples 17 to 23. In addition, the compositions in Examples 25 to 34 have higher thermal deformation temperature, cracking resistance and bending strength than those in Comparative Examples 17 to 23. The compositions in Examples 25 to 34 are applicable for a metal insert and a large cast product.

available from ICI; average thickness: 2 μm and average length: 40 μm), and glass fibers (Glass Milled Fiber REV7 available from Nippon Sheet Glass Co., Ltd.; average thickness: 13 μm and average length: 60 μm) as fibrous fillers were mixed and stirred by a universal mixer at ratios shown in Table 6. The resultant compositions were sufficiently deaerated in vacuum and cured in molds at 150° C. for 15 hours to prepare test samples. Various curing catalysts were mixed in the compositions in Examples 35 to 37. The compositions in Examples 38 and 39 were prepared within the proper PBO range. The compositions in Examples 40 to 44 were prepared within the proper ranges of particulate and fibrous fillers. Evaluation results are summarized in Table 7.

COMPARATIVE EXAMPLES 24–30

An oxazoline compound (PBO) was not used in the composition in Comparative Example 24. The PBO range for the compositions in Comparative Examples 25 and 26 was outside the proper range. The ranges of

TABLE 6

| | Unit | Example 25 | 26 | 27 | 28 | 29 | 30 | 31 | 32 | 33 | 34 | Comparative Example 17 | 18 | 19 | 20 | Example 21 | 22 | 23 |
|---|---|---|---|---|---|---|---|---|---|---|---|---|---|---|---|---|---|---|
| Epicoat 828 | Parts by weight | 100 | 100 | 100 | 100 | 100 | 100 | 100 | 100 | 100 | 100 | 100 | 100 | 100 | 100 | 100 | 100 | 100 |
| PBO | | 30 | 30 | 30 | 6 | 60 | 30 | 30 | 30 | 30 | 30 | | 5 | 80 | 30 | 30 | 30 | 30 |
| Diethylamino-propylamine (DEAPA) | | 5 | | | | | | | | | | | | | | | | |
| Diaminodi-phenylmethane (DDM) | | | 12 | | 12 | 12 | 12 | 12 | 12 | 12 | 12 | 20 | 12 | 12 | 12 | 12 | 12 | 12 |
| Acmex H84 | | | | 12 | | | | | | | | | | | | | | |
| Silica Powder 5× | | | | | | | 200 | 320 | 120 | 65 | 250 | 200 | 200 | 200 | 360 | 40 | 50 | 300 |
| Alumina Powder LA #4000 | | 300 | 300 | 300 | 300 | 300 | | | | | | | | | | | | |
| Glass MF REV 7 (average length: 60 μm) | | | | | | | 200 | 80 | 280 | 65 | 250 | 200 | 200 | 200 | 40 | 360 | 50 | 300 |
| Ceramic Fiber FF (average length: 40 μm) | | 200 | 200 | 200 | 200 | 200 | | | | | | | | | | | | |
| Fluidity[1] | | ⊚ | ⊚ | ⊚ | ⊚ | ⊚ | ⊚ | ○ | ○ | ⊚ | ○ | ⊚ | ⊚ | ⊚ | X | X | ⊚ | X |
| Cracking Resistance[2] | | 10< | 10< | 10< | 10< | 10< | 10< | 7 | 10< | 7 | 10< | 5 | 6 | 14 | — | — | 1 | — |
| Thermal Deformation Temperature[3] | °C. | 150 | 180 | 160 | 160 | 160 | 170 | 160 | 170 | 160 | 170 | 130 | 140 | 140 | — | — | 140 | — |
| Bending Strength[4] | kg/mm² | 20 | 20 | 20 | 17 | 18 | 23 | 18 | 21 | 18 | 23 | 14 | 16 | 13 | — | — | 15 | — |

[1]Visual estimation
[2]Olyphant method (Kogyo Zairyo, Vol. 129, No. 5, P-59, 1981)
[3],[4]JIS K6911
⊚ Excellent
○ Good
X Not castable

EXAMPLES 35–44

Bisphenol A-diglycidyl ether (Epicoat 828 available from Shell Chemical Corp.: epoxy equivalent weight: 190) and 2,2'-(1,3-phenylene)bis(2-oxazoline) (to be referred to as a PBO hereinafter) as epoxy resins; benzyldimethylamine (BDMA), 2-ethylmethylimidazole, and BF3-monoethylamine as curing catalysts; a silica powder (5× available from Tatsumori K.K.; average particle size: 1 μm) and an alumina powder (LA1200 available from Taiheiyo Random K.K.; average particle size: 15 μm) as particulate fillers; and alumina fibers (Sufill particulate and fibrous fillers for the compositions in Comparative Examples 27 to 30 were outside the proper ranges. Evaluation results are summarized in Table 7.

As is apparent from Table 7, the compositions in Examples 35 to 44 have better fluidity than those in Comparative Examples 24 to 30. In addition, the compositions in Examples 35 to 44 have higher thermal deformation temperature, cracking resistance and bending strength than those in Comparative Examples 24 to 30. The compositions in Examples 35 to 44 are applicable for a metal insert and a large cast product.

TABLE 7

| | Example |
|---|---|

TABLE 7-continued

|  | Unit | 35 | 36 | 37 | 38 | 39 | 40 | 41 | 42 | 43 | 44 |
|---|---|---|---|---|---|---|---|---|---|---|---|
| Epicoat 818 | Parts | 100 | 100 | 100 | 100 | 100 | 100 | 100 | 100 | 100 | 100 |
| PBO | by | 30 | 30 | 30 | 6 | 60 | 30 | 30 | 30 | 30 | 30 |
| BDMA | weight | 3 |  |  |  |  |  |  |  |  |  |
| 2-ethylmethyl-imidazole |  |  | 2 |  | 2 | 2 | 2 | 2 | 2 | 2 | 2 |
| BF$_3$-monoethyl-amine |  |  |  | 2 |  |  |  |  |  |  |  |
| Silica Powder 5X |  | 200 | 200 | 200 | 200 | 200 |  | 320 | 120 | 60 | 250 |
| Alumina Powder LA #1200 |  |  |  |  |  |  | 350 |  |  |  |  |
| Glass MF REV 7 (average length: 60 μm) |  | 200 | 200 | 200 | 200 | 200 |  | 80 | 280 | 60 | 250 |
| Alumina Fiber (Sufill) (average length: 40 μm) |  |  |  |  |  |  | 200 |  |  |  |  |
| Fluidity (1) |  | ⊚ | ⊚ | ⊚ | ⊚ | ⊚ | ○ | ○ | ○ | ○ | ○ |
| Cracking Resistance (2) |  | 10< | 10< | 10< | 8 | 9 | 10< | 7 | 10< | 7 | 10< |
| Thermal Deformation Temperature (3) | °C. | 170 | 160 | 170 | 150 | 155 | 165 | 160 | 160 | 160 | 160 |
| Bending Strength (4) | kg/mm$^2$ | 22 | 23 | 21 | 20 | 20 | 19 | 21 | 24 | 20 | 22 |

|  |  | Comparative Example | | | | | | |
|---|---|---|---|---|---|---|---|---|
|  | Unit | 24 | 25 | 26 | 27 | 28 | 29 | 30 |
| Epicoat 818 | Parts | 100 | 100 | 100 | 100 | 100 | 100 | 100 |
| PBO | by |  | 5 | 80 | 30 | 30 | 30 | 30 |
| BDMA | weight |  |  |  |  |  |  |  |
| 2-ethylmethyl-imidazole |  | 3 | 2 | 2 | 2 | 2 | 2 | 2 |
| BF$_3$-monoethyl-amine |  |  |  |  |  |  |  |  |
| Silica Powder 5X |  | 200 | 200 | 200 | 380 | 40 | 40 | 40 |
| Alumina Powder LA #1200 |  |  |  |  |  |  |  |  |
| Glass MF REV 7 (average length: 60 μm) |  | 200 | 200 | 200 | 20 | 360 | 40 | 300 |
| Alumina Fiber (Sufill) (average length: 40 μm) |  |  |  |  |  |  |  |  |
| Fluidity (1) |  |  | ⊚ | ⊚ | ⊚ | X | X | ⊚ | X |
| Cracking Resistance (2) |  | 5 | 5 | 14 | — | — | 1 | — |
| Thermal Deformation Temperature (3) | °C. | 130 | 140 | 145 | — | — | 146 | — |
| Bending Strength (4) | kg/mm$^2$ | 18 | 19 | 17 | — | — | 17 | — |

(1) Visual estimation ⊚ Excellent ○ Good X Not castable
(2) Olyphant method (Kogyo Zairyo, Vol. 129, No. 5, P-59, 1981)
(3) (4) JIS K6911

EXAMPLES 45-56

Bisphenol A-diglycidyl ether (Epicoat 828 available from Shell Chemical Corp.: epoxy equivalent weight: 190) and 2,2'-(1,3-phenylene)bis(2-oxazoline) (to be referred to as a PBO hereinafter) as epoxy resins; methylhexahydrophthalate anhydride (MH700 available from Shinnihon Rikasha K.K.), adipic acid, and bisphenol A as curing agents; 1,8-diaza-bicyclo(5,4,0)undecene(DBU), benzyldimethylamine (BDMA), 2-ethylmethylimidazole, and BF$_3$-monoethylamine as curing catalysts; a silica powder (5× available from Tatsumori K.K.; average particle size: 1 μm) and an alumina powder (AL-45H available from Showa Keikinzoku K.K.; average particle size: 3 μm) as particulate fillers; and ceramic fibers (Fiber Flux available from Toshiba Monoflux K.K.: average length: 40 μm), and glass fibers (Glass Milled Fiber REV7 available from Nippon Sheet Glass Co., Ltd.; average thickness: 13 μm and average length: 60 μm) as fibrous fillers were mixed and stirred by a universal mixer at ratios shown in Table 6. The resultant compositions were sufficiently deaerated in vacuum and cured in molds at 150° C. for 15 hours to prepare test samples. Various curing agents and catalysts were mixed in the compositions in Examples 45 to 50. The compositions in Examples 51 and 52 were prepared within the proper PBO range. The compositions in Examples 53 to 56 were prepared within the proper ranges of particulate and fibrous fillers. Evaluation results are summarized in Table 8.

COMPARATIVE EXAMPLES 31-37

An oxazoline compound (PBO) was not used in the composition in Comparative Example 31. The PBO range for the compositions in Comparative Examples 32 and 33 was outside the proper range. The ranges of particulate and fibrous fillers for the compositions in Comparative Examples 34 to 37 were outside the proper ranges. Evaluation results are summarized in Table 8.

As is apparent from Table 8, the compositions in Examples 45 to 56 have better fluidity than those in Comparative Examples 31 to 37. In addition, the compositions in Examples 45 to 56 have higher thermal deformation temperature, cracking resistance and bending strength than those in Comparative Examples 31 to 37. The compositions in Examples 45 to 56 are applicable for a metal insert and a large cast product.

EXAMPLES 57-62

Bisphenol A-diglycidyl ethers (Araldyte GY260 available from Ciba-Geigy Corp.; epoxy equivalent weight: 190) and (Epicoat 834 avaliable from Shell Chemical Corp.; epoxy equivalent weight: 250) and 2,2'-(1,3-phenylene)bis(2-oxazoline) (to be referred to as a PBO hereinafter) as epoxy resins; diaminodiphenylmethane (DDM), diaminodiphenylsulfone (DDS), and 3,9-bis(3-aminopropyl)-2,4,8,10-tetraoxaspiro(5,5)undecane (Ebomate B-002 available from Mitsubishi Petrochemical Co., Ltd.) as amine compounds; and a silica powder (5× available from Tatsumori K.K.) and an alumina powder (LA#4000 available from Taiheiyo Random K.K.) as fillers were mixed and stirred by a universal mixer. The resultant mixtures were suffi-

TABLE 8

|  | Unit | Example |  |  |  |  |  |  |  |  |  |  |  |
|---|---|---|---|---|---|---|---|---|---|---|---|---|---|
|  |  | 45 | 46 | 47 | 48 | 49 | 50 | 51 | 52 | 53 | 54 | 55 | 56 |
| Epicoat 828 | Parts by Weight | 100 | 100 | 100 | 100 | 100 | 100 | 100 | 100 | 100 | 100 | 100 | 100 |
| PBO | " | 30 | 30 | 30 | 30 | 30 | 30 | 6 | 70 | 30 | 30 | 30 | 30 |
| MH700 | " |  |  |  |  | 8 |  |  |  |  |  |  |  |
| Adipic Acid | " | 4 | 4 | 4 | 4 |  |  | 4 | 4 | 4 | 4 | 4 | 4 |
| Bisphenol A | " |  |  |  |  |  | 6 |  |  |  |  |  |  |
| BDMA | " | 2.5 |  |  |  | 2.5 | 2.5 | 2.5 | 2.5 | 2.5 | 2.5 | 2.5 | 2.5 |
| BDU | " |  | 2.0 |  |  |  |  |  |  |  |  |  |  |
| 2-ethylmethyl-imidazole | " |  |  | 2.0 |  |  |  |  |  |  |  |  |  |
| BF$_3$-monoethyl-amine | " |  |  |  | 2.0 |  |  |  |  |  |  |  |  |
| Silica Powder 5X | " |  |  |  |  |  |  |  |  |  |  |  |  |
| Alumina Powder AL-45H | " | 250 | 250 | 250 | 250 | 250 | 250 | 250 | 250 | 400 | 100 | 80 | 350 |
| Glass MF REV 7 (average length: 60 μm) | " |  |  |  |  |  |  |  |  |  |  |  |  |
| Ceramic Fiber FF (average length: 40 μm) | " | 250 | 250 | 250 | 250 | 250 | 250 | 250 | 250 | 100 | 400 | 80 | 300 |
| Fluidity (1) |  | ⊙ | ⊙ | ⊙ | ⊙ | ⊙ | ⊙ | ⊙ | ⊙ | ○ | ○ | ⊙ | ○ |
| Cracking Resistance (2) |  | 10< | 10< | 10< | 10< | 10< | 10< | 8 | 7 | 7 | 10< | 6 | 10< |
| Thermal Deformation Temperature (3) | °C. | 160 | 170 | 170 | 180 | 170 | 160 | 150 | 155 | 160 | 170 | 150 | 180 |
| Bending Strength (4) | kg/mm$^2$ | 21 | 22 | 20 | 20 | 21 | 22 | 17 | 18 | 19 | 21 | 17 | 22 |

|  |  | Unit | Comparative Example |  |  |  |  |  |  |
|---|---|---|---|---|---|---|---|---|---|
|  |  |  | 31 | 32 | 33 | 34 | 35 | 36 | 37 |
|  | Epicoat 828 | Parts by Weight | 100 | 100 | 100 | 100 | 100 | 100 | 100 |
|  | PBO | " |  | 5 | 80 | 30 | 30 | 30 | 30 |
|  | MH700 | " | 80 | 8 | 8 | 8 | 8 | 8 | 8 |
|  | Adipic Acid | " |  |  |  |  |  |  |  |
|  | Bisphenol A | " |  |  |  |  |  |  |  |
|  | BDMA | " | 0.5 | 2.5 | 2.5 | 2.5 | 2.5 | 2.5 | 2.5 |
|  | BDU | " |  |  |  |  |  |  |  |
|  | 2-ethylmethyl-imidazole | " |  |  |  |  |  |  |  |
|  | BF$_3$-monoethyl-amine | " |  |  |  |  |  |  |  |
|  | Silica Powder 5X | " |  |  |  |  |  |  |  |
|  | Alumina Powder AL-45H |  | 250 | 250 | 250 | 470 | 50 | 60 | 400 |
|  | Glass MF REV 7 (average length: 60 μm) |  |  |  |  |  |  |  |  |
|  | Ceramic Fiber FF (average length: 40 μm) | " | 250 | 250 | 250 | 30 | 450 | 60 | 400 |
|  | Fluidity (1) |  | ⊙ | ⊙ | ⊙ | X | X | ⊙ | X |
|  | Cracking Resistance (2) |  | 15 | 3 | 5 | — | — | 1 | — |
|  | Thermal Deformation Temperature (3) | °C. | 130 | 140 | 140 | — | — | 145 | — |
|  | Bending Strength (4) | kg/mm$^2$ | 14 | 16 | 15 | — | — | 16 | — |

(1) Visual estimation ⊙ Excellent ○ Good X Not castable
(2) Olyphant method (Kogyo Zairyo Vol. 129, No. 5, P-59, 1981)
(3) (4) JIS K-6911 ciently deaerated in vacuum and heated and cured in molds at 150° C. for 15 hours to prepare test samples. Various amine compounds and various fillers were mixed to prepare compositions in Examples 57 to 60. The compositions in Examples 61 and 62 were prepared within the proper PBO range. Evaluation results are summarized in Table 9.

COMPARATIVE EXAMPLES 38-40

A composition in Comparative Example 38 was prepared without using an oxazoline compound (PBO). Compositions in Comparative Examples 39 and 40 were prepared when the contents of PBO fell outside the proper range. Evaluation results are summarized in Table 9.

EXAMPLE 63

Following the same procedures as in Examples 57 to 62, an epoxy resin, PBO, an adduct amine compound, a filler, and glass chip strands (Microchop Strand available from Nippon Sheet Glass Co., Ltd.; fiber length: 12 mm) were mixed and kneaded by a kneader at ratios shown in Table 9. Kneaded products were pressed to prepare test samples. Evaluation results are summarized in Table 9.

COMPARATIVE EXAMPLE 41

A composition in Comparative Example 41 was prepared without using PBO. Evaluation results are summarized in Table 9.

As is apparent from Table 9, the compositions in Examples 57 to 63 have higher thermal deformation temperature, cracking resistance, and mechanical strength than those in Comparative Examples 38 to 41. Therefore, the compositions of the examples can be used in a variety of applications as casting/molding resins.

180), neopentylglycoldiglycidyl ether (1500 NP available from Kyoeisha Yushi Kagaku Kogyo K.K.), and 2,2'-(1,3phenylene)bis(2-oxazoline) (to be referred to as a PBO hereinafter) as epoxy resins; and 1,8-diaza-bicyclo (5,4,0)undecene-7(DBU), 2-ethylmethylimidazole, and BF3-monoethylamine as curing agents were mixed and molded under the conditions shown in Table 10 to prepare test samples for measuring thermal deformation temperature, cracking resistance, and dielectric strength. In addition, a mica tape was wound around square copper wires (DGV available from Showa Electric Wire & Cable Co., Ltd.) and the resultant structures were impregnated with the above-mentioned resin compositions. The resins were cured at 150° C. for 15 hours to prepare test samples for adhesion strength. Various curing catalysts were mixed to prepare the compositions in Examples 64 to 66. The contents of PBO in the compositions in Examples 67 and 68 fell within the proper range. Evaluation results are summarized in Table 10.

COMPARATIVE EXAMPLES 42-44

An oxazoline compound (PBO) was not used to prepare the composition in Comparative Example 42. The contents of PBO in the compositions of Comparative Examples 43 and 44 fell outside the proper range. Evaluation results are summarized in Table 10.

As is apparent from Table 10, the compositions in Examples 64 to 68 have higher thermal deformation temperature and cracking resistance (heat cycle resistance) than those in Comparative Examples 42 to 44. The compositions of Examples 64 to 68 are suitable for impregnation varnish materials for coils requiring high heat resistance. In addition, the compositions in Examples 64 to 68 have high dielectric strength and adhesion strength than those in Comparative Examples 42 to 44 and can be used in a variety of applications as impregnation varnish materials.

TABLE 9

|  | Unit | Example |  |  |  |  |  |  | Comparative Example |  |  |  |
|---|---|---|---|---|---|---|---|---|---|---|---|---|
|  |  | 57 | 58 | 59 | 60 | 61 | 62 | 63 | 38 | 39 | 40 | 41 |
| Araldyte GY260 | Parts by weight | 100 | 100 | 100 | 100 | 100 | 100 | 60 | 100 | 100 | 100 | 100 |
| Epicoat 834 | " |  |  |  |  |  |  | 40 |  |  |  | 40 |
| PBO | " | 30 | 30 | 30 | 30 | 6 | 60 | 30 |  | 5 | 80 |  |
| DBU | " |  |  |  |  |  |  | 2 | 5 | 2 | 2 | 5 |
| 1-benzil-2-methyl-imidazole | " |  |  |  |  |  |  |  |  |  |  |  |
| Diaminodiphenyl-methane (DDW) | " | 10 |  |  | 10 | 10 | 10 |  |  |  |  |  |
| Diaminodiphenyl-sulfone (DDS) | " |  | 15 |  |  |  |  |  |  |  |  |  |
| Ebomate B-002 | " |  |  | 20 |  |  |  |  |  |  |  |  |
| Silica Powder 5X | " |  |  |  | 300 |  |  | 250 |  |  |  | 250 |
| Alumina Powder LA #400 | " | 500 | 500 | 500 |  | 500 | 500 |  | 500 | 500 | 500 |  |
| Glass Fiber (l = 12 mm) | " |  |  |  |  |  |  | 5 |  |  |  | 5 |
| Thermal Deformation Temperature (1) | °C. | 160 | 170 | 155 | 160 | 140 | 150 | 160 | 120 | 130 | 130 | 120 |
| Cracking Resistance (2) |  | 5 | 5 | 6 | 7 | 5 | 6 | 10< | 0 | 1 | 1 | 3 |
| Tensile Strength (3) | kg/mm$^2$ | 15 | 15 | 16 | 17 | 14 | 13 | 15 | 10 | 10 | 12 | 12 |

(1) (3) JIS 6911
(2) Olyphant method (Kogyo Zairyo, Vol. 129, No. 5, P-59, 1981)

EXAMPLES 64-68

Bisphenol A-diglycidyl ether (Epicoat 828 available from Shell Chemical Corp.; epoxy equivalent weight:

TABLE 10

|  | Unit | Example | | | | | Comparative Example | | |
| --- | --- | --- | --- | --- | --- | --- | --- | --- | --- |
|  |  | 64 | 65 | 66 | 67 | 68 | 42 | 43 | 44 |
| Epicoat 828 | Parts by Weight | 100 | 100 | 100 | 100 | 100 | 100 | 100 | 100 |
| 1500 NP | Parts by Weight | 20 | 20 | 20 | 20 | 20 | 20 | 20 | 20 |
| PBO | Parts by Weight | 30 | 30 | 30 | 6 | 60 |  | 5 | 80 |
| DBU | Parts by Weight | 3 |  |  | 3 | 3 | 5 | 3 | 3 |
| 2-ethylmethyl-imidazole | Parts by Weight |  | 1 |  |  |  |  |  |  |
| BF$_3$—monoethyl-amine | Parts by Weight |  |  | 1 |  |  |  |  |  |
| Thermal Deformation Temperature (1) | °C. | 170 | 165 | 180 | 150 | 160 | 130 | 133 | 140 |
| Cracking Resistance (2) |  | Not Cracked | Not Cracked | Not Cracked | Not Cracked | Not Cracked | Cracked | Not Cracked | Not Cracked |
| Dielectric Strength (25° C.) (3) | KV/mm | 23 | 21 | 22 | 22 | 20 | 18 | 21 | 16 |
| Adhesion Strength (100° C.) (4) | kg/cm$^2$ | 35 | 33 | 38 | 30 | 28 | 25 | 23 | 25 |

(1) (3) JIS K6911
(2) Three kinds of M8 hexagon head nuts (JISB1181) were placed at the central portion of an aluminum petridish, and varnish was poured and hardened in the petridish. A heat cycle (100° C. for an hour and 20° C. for an hour) was repeated 10 times and the presence/absence of cracks was checked.
(4) A mica tape was wound between square electric wires, the resultant structure was impregnated with a resin, and the resin was cured. An adhesion force of the mica tape was measured by a tension gauge.

Examples 69–77

Bisphenol A-diglycidyl ether (Epicoat 828 available from Shell Chemical Corp.; epoxy equivalent weight: 180), neopentylglycoldiglycidyl ether (1500 NP available from Kyoeisha Yushi Kagaku Kogyo K.K.), and 2,2′-(1,3-phenylene)bis(2-oxazoline) (to be referred to as a PBO hereinafter) as epoxy resins; 1,8-diaza-bicyclo (5,4,0) undecene-7(DBU), 2-ethylmethylimidazole, and BF3-monoethylamine as curing agents; and methylhexahydrophthalate anhydride (MH700 available from Shinnihon Rika K.K.), adipic acid, and bisphenol A as curing agents were mixed at ratios shown Table 11 and molded at 150° C. for 15 hours to prepare test samples for measuring thermal deformation temperature, cracking resistance, and dielectric strength. In addition, a mica tape was wound around square copper wires (DGL available from Showa Electric Wire & Cable Co., Ltd.) and the resultant structures were impregnated with the above-mentioned resin compositions. The resins were cured at 150° C. for 15 hours to prepare test samples for adhesion strength. Various curing agents and various curing catalysts were mixed to prepare the compositions in Examples 69 to 75. The contents of PBO in the compositions in Examples 76 and 77 fell within the proper range. Evaluation results are summarized in Table 11.

COMPARATIVE EXAMPLES 45–47

An oxazoline compound (PBO) was not used to prepare the composition in Comparative Example 45. The contents of PBO in the compositions of Comparative Examples 46 and 47 fell outside the proper range. Evaluation results are summarized in Table 11.

As is apparent from Table 11, the compositions in Examples 69 to 77 have higher thermal deformation temperature and cracking resistance (heat cycle resistance) than those in Comparative Examples 45 to 47. The compositions of Examples 69 to 77 are suitable for impregnation varnish materials for coils requiring high heat resistance. In addition, the compositions in Examples 69 to 77 have high dielectric strength and adhesion strength than those in Comparative Examples 45 to 47 and can be used in a variety of applications as impregnation varnish materials.

TABLE 11

|  | Unit | Example | | | | | |
| --- | --- | --- | --- | --- | --- | --- | --- |
|  |  | 69 | 70 | 71 | 72 | 73 | 74 |
| Epicoat 828 | Parts by Weight | 100 | 100 | 100 | 100 | 100 | 100 |
| 1500 NP | Parts by Weight | 20 | 20 | 20 | 20 | 20 | 20 |
| PBO | Parts by Weight | 30 | 30 | 30 | 30 | 30 | 30 |
| MH700 | Parts by Weight | 8 | 8 | 8 | 8 |  |  |
| Adipic Acid | Parts by Weight |  |  |  |  | 4 | 4 |
| Bisphenol A | Parts by Weight |  |  |  |  |  |  |
| BDMA | Parts by Weight | 3.0 |  |  |  |  |  |
| DBU | Parts by Weight |  | 1.5 |  |  | 1.5 |  |
| 2-ethylmethyl-imidazole | Parts by Weight |  |  | 1.0 |  |  | 1.0 |
| BF$_3$—monoethyl-amine | Parts by Weight |  |  |  | 0.5 |  |  |

TABLE 11-continued

| | | | | | | | |
|---|---|---|---|---|---|---|---|
| Thermal Deformation Temperature (1) | °C. | 150 | 160 | 160 | 170 | 170 | 165 |
| Cracking Resistance (2) | | Not Cracked | Not Cracked | Not Cracked | Not Cracked | Not Cracked | Not Cracked |
| Dielectric Strength (25° C.) (3) | KV/mm | 20 | 23 | 22 | 22 | 20 | 21 |
| Adhesion Strength (100° C.) (4) | kg/cm$^2$ | 33 | 38 | 35 | 36 | 35 | 34 |

| | | Example | | | Comparative Example | | |
|---|---|---|---|---|---|---|---|
| | Unit | 75 | 76 | 77 | 45 | 46 | 47 |
| Epicoat 828 | Parts by Weight | 100 | 100 | 100 | 100 | 100 | 100 |
| 1500 NP | Parts by Weight | 20 | 20 | 20 | 20 | 20 | 20 |
| PBO | Parts by Weight | 30 | 6 | 60 | | 5 | 80 |
| MH700 | Parts by Weight | | 8 | 8 | 80 | 8 | 8 |
| Adipic Acid | Parts by Weight | | | | | | |
| Bisphenol A | Parts by Weight | 6 | | | | | |
| BDMA | Parts by Weight | | | | 0.5 | | |
| DBU | Parts by Weight | | | | | | |
| 2-ethylmethyl-imidazole | Parts by Weight | 1.0 | 1.0 | 1.0 | | 1.0 | 1.0 |
| BF$_3$—monoethyl-amine | Parts by Weight | | | | | | |
| Thermal Deformation Temperature (1) | °C. | 160 | 150 | 155 | 140 | 140 | 140 |
| Cracking Resistance (2) | | Not Cracked | Not Cracked | Not Cracked | Cracked | Cracked | Not Cracked |
| Dielectric Strength (25° C.) (3) | KV/mm | 20 | 21 | 18 | 16 | 18 | 15 |
| Adhesion Strength (100° C.) (4) | kg/cm$^2$ | 33 | 29 | 27 | 23 | 25 | 26 |

(1) (3) JIS K6911
(2) Three kinds of M8 hexagon head nuts (JISB1181) were placed at the central portion of an aluminum petridish, and varnish was poured and hardened in the petridish. A heat cycle (100° C. for an hour and 20° C. for an hour) was repeated 10 times and the presence/absence of cracks was checked.
(4) A mica tape was wound between square electric wires, the resultant structure was impregnated with a resin, and the resin was cured. An adhesion force of the mica tape was measured by a tension gauge.

EXAMPLES 78-82

Bisphenol A-diglycidyl ether (Epicoat 828 available from Shell Chemical Corp.; epoxy equivalent weight: 180), neopentylglycoldiglycidyl ether (1500 NP available from Kyoeisha Yushi Kagaku Kogyo K.K.), and 2,2′-(1,3-phenylene)bis(2-oxazoline) (to be referred to as a PBO hereinafter) as epoxy resins; and diethylaminopropylamine (DEAPA), diaminodiphenylmethane (DDM), and DDM epoxy resin aduct (Acmex H84 available from Nippon Goseika Kogyosha K.K.) as adduct amine compounds were mixed at ratios shown in Table 12 and molded at 150° C. for 15 hours to prepare test samples for measuring thermal deformation temperature, cracking resistance, and dielectric strength. In addition, a mica tape was wound around square copper wires (DGV available from Showa Electric Wire & Cable Co., Ltd.) and the resultant structures were impregnated with the above-mentioned resin compositions. The resins were cured at 150° C. for 15 hours to prepare test samples for adhesion strength. Various additive amine compounds were mixed to prepare the compositions in Examples 78 to 80. The contents of PBO in the compositions in Examples 81 and 82 fell within the proper range. Evaluation results are summarized in Table 12.1

COMPARATIVE EXAMPLES

An oxazoline compound (PBO) was not used to prepare the composition in Comparative Example 48. The contents of PBO in the compositions of Comparative Examples 49 and 50 fell outside the proper range. Evaluation results are summarized in Table 12.

As is apparent from Table 12, the compositions in Examples 78 to 82 have higher thermal deformation temperature and cracking resistance (heat resistance cycle) than those in Comparative Examples 48 to 50. The compositions of Examples 78 to 82 are suitable for impregnation varnish materials for coils requiring high heat resistance. In addition, the compositions in Examples 78 to 82 have high dielectric strength and adhesion strength than those in Comparative Examples 48 to 50 and can be used in a variety of applications as impregnation varnish materials.

TABLE 12

| | | Example | | | | | Comparative Example | | |
|---|---|---|---|---|---|---|---|---|---|
| | Unit | 78 | 79 | 80 | 81 | 82 | 48 | 49 | 50 |
| Epicoat 828 | Parts by weight | 100 | 100 | 100 | 100 | 100 | 100 | 100 | 100 |
| 1500 NP | | 20 | 20 | 20 | 20 | 20 | 20 | 20 | 20 |

TABLE 12-continued

|  | Unit | Example | | | | | Comparative Example | | |
|---|---|---|---|---|---|---|---|---|---|
|  |  | 78 | 79 | 80 | 81 | 82 | 48 | 49 | 50 |
| PBO |  | 30 | 30 | 30 | 6 | 60 |  | 5 | 80 |
| Diethylaminopropylamine (DEAPA) |  | 4 |  |  |  |  |  |  |  |
| Diaminodiphenylmethane (DDM) |  |  | 10 |  |  |  |  |  |  |
| Acmex H84 | kg/cm² |  |  | 10 | 10 | 10 | 50 | 10 | 10 |
| Thermal Deformation Temperature (1) | °C. | 160 | 180 | 160 | 150 | 160 | 130 | 135 | 137 |
| Cracking Resistance (2) |  | Not Cracked | Not Cracked | Not Cracked | Not Cracked | Not Cracked | Cracked | Cracked | Not Cracked |
| Dielectric Strength (25° C.) (3) | KV/mm | 21 | 23 | 22 | 22 | 20 | 17 | 18 | 16 |
| Adhesion Strength (100° C.) (4) | kg/cm² | 33 | 35 | 32 | 32 | 32 | 25 | 22 | 24 |

(1) (3) JIS K6911
(2) Three kinds of M8 hexagon head nuts (JISB1181) were placed at the central portion of an aluminum petridish, and varnish was poured and hardened in the petridish. A heat cycle (100° C. for an hour and 20° C. for an hour) was repeated 10 times and the presence/absence of cracks was checked.
(4) A mica tape was wound between square electric wires, the resultant structure was impregnated with a resin, and the resin was cured. An adhesion force of the mica tape was measured by a tension gauge.

EXAMPLE 83

126 parts by weight of Epicoat 154 (available from Yuka Shell K.K.), 294 parts by weight of R371 (avilable from Mitsui Epoxy K.K.), 84 parts by weight of 2,2'-(1,3-phenylene)bis(2-oxazoline) (available from Takeda Chemical Industries, Ltd.), 6.3 parts by weight of Curesol 2E4MZ (available from Shikoku Kasei K.K.), and 238.1 parts by dioxane were placed in a 1,000-cc flask having a stirrer, a reflux condenser, and a thermometer and were heated to 90° C. while the materials were being stirred. The mixture was kept at 90° C. for 30 minutes. When the mixture temperature was decreased to 40° C., 102.1 parts by weight of methyl alcohol were added to the mixture. Stirring was continued for 15 minutes. The resultant mixture was filtered to obtain a liquid varnish. The viscosity of this varnish is listed in Table 13.

The resultant varnish was applied to an aluminum plate and was cured at 160° C. for 15 hours. The volume resistivity of the cured resin was measured.

A varnish was prepared such that the content of the resin was 42 to 43% by weight and was applied to 0.18-mm thick glass cloth (available from Arisawa Seisakusho K.K.) treated with epoxy resin. The varnish was dried at a temperature of 70° C. for 10 minutes, thereby obtaining a prepreg.

Ten prepregs were stacked and pressed at 175° C. and a pressure of 35 kgf/cm² for 2 hours to obtain a laminate board. The resultant board was cured at 180° C. for 15 hours. The properties of the resultant board are summarized in Table 13.

EXAMPLE 84

Following the same procedures as in Example 83, 114 parts by weight of Epicoat 154, 226 parts by weight of R371, 95 parts by weight of 2,2'-(1,3-phenylene)bis (2-oxazoline), 11.4 parts by weight of trisdimethylaminomethylphenol (available from Tokyo Kasei Kogyo K.K.), 226.9 parts by weight of dioxane, and 97.3 parts by weight of methyl alcohol were used to prepare a varnish.

The viscosity and electrical characteristics of the resultant varnish were measured, a laminate board was prepared, and its characteristics were measured, following the same procedures as in Example 83. Results are summarized in Table 13.

EXAMPLE 85

Following the same procedures as in Example 83, 123 parts by weight of 2,2'-(3-phenylene)bis(2-oxazoline), 123 parts by weight of Epicoat 154, 287 parts by weight of R371, 8.2 parts by weight of BF₃-monoethylamine complex (available from Hashimoto Kasei Kogyo K.K.), 252.6 parts by weight of dioxane, and 108.2 parts by weight of methyl alcohol were used to prepare a varnish.

The viscosity and electrical characteristics of the resultant varnish were measured, a laminate board was prepared, and its characteristics were measured, following the same procedures as in Example 83. Results are summarized in Table 13.

EXAMPLE 86

Following the same procedures as in Example 83, 292.5 parts by weight of R371, 97.5 parts by weight of 2,2'-(1,3-phenylene)bis(2-oxazoline), 97.5 parts by weight of Epicoat 154, 5.9 parts by weight of trisdimethylaminomethylphenol, 3.9 parts by weight of BF₃-monoethylamine complex, 199 parts by weight of dioxane, and 133 parts by weight of methyl alcohol were used to prepare a varnish.

The viscosity and electrical characteristics of the resultant varnish were measured, a laminate board was prepared, and its characteristics were measured, following the same procedures as in Example 83. Results are summarized in Table 13.

COMPARATIVE EXAMPLE 51

Following the same procedures as in Example 83, A resin composition containing Epicoat 1001, Epicoat 828, and dicyanediamide was used to prepare a laminate board. The bending strength of the resultant board was measured and was listed in Table 13.

TABLE 13

|  | Example | | | | Comparative Example |
|---|---|---|---|---|---|
|  | 83 | 84 | 85 | 86 | 51 |
| 1 Viscosity | 252 | 268 | 295 | 249 | — |

TABLE 13-continued

|  | Example | | | | Comparative Example |
|---|---|---|---|---|---|
|  | 83 | 84 | 85 | 86 | 51 |
| (25° C. CPS) | | | | | |
| 2 Volume Resistivity (30° C. Ω · cm) | $5 \times 10^{15}$ | $3 \times 10^{15}$ | $1 \times 10^{15}$ | $3 \times 10^{15}$ | — |
| 3 Bending Strength (kgf/mm$^2$) | | | | | |
| 30° C. | 50 | 48 | 54 | 52 | 48 |
| 130° C. | 39 | 38 | 46 | 38 | 19 |
| Holding percentage (%) | 78 | 79 | 85 | 73 | 40 |

1 JIS C 2103
2 JIS C 2103
3 JIS C 6911

EXAMPLE 87

322 parts by weight of Epicoat 1001 (available from Yuka Shell K.K.), 107 parts by weight of R710 (available from Mitsui Epoxy K.K.), 86 parts by weight of 2,2,'1 -(1,3-phenylene)bis(2-oxazoline)(available from Takeda Chemical Industries. Ltd.), 17 2 parts by weight of tetrahydrophthalic anhydride (available from Nihon Kayaku K.K.), 2.2 parts by weight of benzyldimethylamine (Tokyo Kasei Kogyo K.K.), and 232 parts by weight of dioxane were placed in a 1,000-cc flask having a stirrer, a reflux condenser, and a thermometer and were heated to 90° C. while the materials were being stirred. The mixture was kept at 90° C. for 30 minutes. When the mixture temperature was decreased to 40° C., 125 parts by weight of methyl alcohol were added to the mixture. Stirring was continued for 30 minutes. The resultant mixture was filtered to obtain a liquid varnish. The viscosity of this varnish is listed in Table 13.

The resultant varnish was applied to an aluminum plate and was cured at 160° C. for 15 hours. The volume resistivity of the cured resin was measured.

A varnish was prepared such that the content of the resin was 40 to 43% by weight and was applied to 0.18-mm thick glass cloth (available from Arisawa Seisakusho K.K.) treated with epoxy silane. The varnish was dried at a temperature of 70° C. for 10 minutes, thereby obtaining a prepreg. Ten prepregs were stacked and pressed at 175° C. and a pressure of 35 kgf/cm$^2$ for 2 hours to obtain a laminate board. The resultant board was cured at 180° C. for 15 hours. The properties of the resultant board are summarized in Table 14.

EXAMPLE 88

Following the same procedures as in Example 87, 82 parts by weight of R710, 328 parts by weight of Epicoat 1001, 103 parts by weight of 2,2'-(1,3-phenylene)bis (2-oxazoline), 8.2 parts by weight of adipic acid (available from SUMITOMO CHEMICAL CO., LTD.), 4.1 parts by weight of BF$_3$-monoethylamine complex (available from Hashimoto Kasei Kogyo K.K.), 227 parts by weight of dioxane, and 123 parts by weight of methyl alcohol were used to prepare a varnish.

The viscosity and electrical characteristics of the resultant varnish were measured, a laminate board was prepared, and its characteristics were measured, following the same procedures as in Example 87. Results are summarized in Table 14.

EXAMPLE 89

Following the same procedures as in Example 87, 117 parts by weight of 2,2'-(1,3-phenylene)bis(2-oxazoline), 97 parts by weight of R710, 293 parts by weight of Epicoat 1001, 7.8 parts by weight of terephthalic acid (available from Mitsui Petrochemical Industries, Ltd.), 2 parts by weight of trisdimethylaminomethylphenol (available from Tokyo Kasei Kogyo K.K.), 224 parts by weight of dioxane, and 121 parts by weight of methyl alcohol were used to prepare a varnish. The viscosity and electrical characteristics of the resultant varnish were measured, a laminate board was prepared, and its characteristics were measured, following the same procedures as in Example 87. Results are summarized in Table 14.

EXAMPLE 90

Following the same procedures as in Example 87, 86 parts by weight of R710, 107 parts by weight of 2,2'-(1,3-phenylene)bis(2-oxazoline), 344 parts by weight of Epicoat 1001, 8.6 parts by weight of terephthalic acid, 4.3 parts by weight of BF$_3$-monomethylamine complex, 238 parts by weight of dioxane, and 129 parts by weight of methyl alcohol were used to prepare a varnish. The viscosity and electrical characteristics of the resultant varnish were measured, a laminate board was prepared, and its characteristics were measured, following the same procedures as in Example 87. Results are summarized in Table 14.

COMPARTIVE EXAMPLE 52

Following the same procedures as in Example 87, a resin composition containing Epicoat 1001, Epicoat 828, and dicyanediamine was used to prepare a laminate board. The bending strength of the resultant board was measured and was listed in Table 14.

TABLE 14

|  | Example | | | | Comparative Example |
|---|---|---|---|---|---|
|  | 87 | 88 | 89 | 90 | 52 |
| 1 Viscosity (25° C. CPS) | 165 | 190 | 197 | 185 | — |
| 2 Volume Resistivity (30° C. Ω · cm) | $7 \times 10^{15}$ | $2 \times 10^{15}$ | $4 \times 10^{15}$ | $1 \times 10^{15}$ | — |
| 3 Bending Strength | | | | | |

TABLE 14-continued

|  | Example | | | | Comparative Example |
|---|---|---|---|---|---|
|  | 87 | 88 | 89 | 90 | 52 |
| (kgf/mm$^2$) | | | | | |
| 30° C. | 52 | 54 | 55 | 54 | 48 |
| 130° C. | 39 | 43 | 42 | 45 | 19 |
| Holding percentage (%) | 75 | 80 | 76 | 83 | 40 |

1 JIS C 2103
2 JIS C 2103
3 JIS C 6911

EXAMPLE 93

84 parts by weight of GY260 (available from Nippon Ciba-Geigy Corp.), 336 parts by weight of Epicoat 1001 (available from Yuka Shell K.K.), 105 parts by weight of 2,2'-(1,3-phenylene)bis(2-oxazoline) available from Takeda Chemical Industries, Ltd.), 2.9 parts by weight of aminophenol (available from Wako Junyaku Kogyo K.K.), 6.3 parts by weight of diaminodiphenylmethane (available from Mitsui Toatsu Chemicals, Inc., and 248 parts by weight of dioxane were placed in a 1,000-cc flask having a stirrer, a reflux condenser, and a thermometer in a reaction chamber and were heated to 90° C. while the materials were being stirred. The mixture was kept at 90° C. 30 minutes. When the mixture temperature was decreased to 40° C., 106 parts by weight of methyl alcohol were added to the mixture. Stirring was continued for 20 minutes. The resultant mixture was filtered to obtain a liquid varnish. The viscosity of this varnish is listed in Table 15.

The resultant varnish was applied to an aluminum plate and was cured at 160° C. for 15 hours. The volume resistivity of the cured resin was measured and summarized in Table 15.

A varnish was prepared such that the content of the resin was 41 to 43% by weight and was applied to 0.18-mm thick glass cloth (available from Arisawa Seisakusho K.K.) treated with epoxy silane. The varnish was dried at a temperature of 70° C. for 10 minutes, thereby obtaining a prepreg. Ten prepregs were stacked and pressed at 175° C. and a pressure of 35 kgf/cm$^2$ for 2 hours to obtain a laminate board. The resultant board was cured at 180° C. for 15 hours. The properties of the resultant board are summarized in Table 15.

EXAMPLE 94

Following the same procedures as in Example 93, 307 parts by weight of Epicoat 1001, 102 parts by weight of GY260, 82 parts by weight of 2,2'(1,3-phenylene)bis (2-oxazoline), 6.2 parts by weight of aminophenol, 232 parts by weight of dioxane, and 99 parts by weight of methyl alcohol were used to prepare a varnish.

The viscosity and electrical characterstics of the resultant varnish were measured, a laminate board was prepared, and its characteristics were measured, following the same procedures as in Example 93. Results are summarized in Table 15.

EXAMPLE 95

Following the same procedures as in Example 93, 78 parts by weight of GY260, 312 parts by weight of Epicoat 1001, 97 parts by weight of 2,2'-(1,3-phenylene)bis (2-oxazoline), 7.8 parts by weight of diaminodiphenylmethane, 231 parts by weight of dioxane, and 99 parts by weight of methyl alcohol were used to prepare a varnish. The viscosity and electrical characterstics of the resultant varnish were measured, a laminate board was prepared, and its characteristics were measured, following the same procedures as in Example 93. Results are summarized in Table 15.

EXAMPLE 96

Following the same procedures as in Example 93, 296 parts by weight of Epicoat 1001, 74 parts by weight of GY260, 111 parts by weight of 2,2'-(1,3-phenylene)bis (2-oxazoline), 11.1 parts by weight of diaminodiphenylsulfone (available from Tokyo Kasei Kogyo K.K.), 289 parts by weight of dioxane, and 98 parts by weight of methyl alcohol were used to prepare a varnish. The viscosity and electrical characteristics of the resultant varnish were measured, a laminate board was prepared, and its characteristics were measured, following the same procedures as in Example 93. Results are summarized in Table 15.

COMPARATIVE EXAMPLE 53

Following the same procedures as in Example 93, a resin composition containing Epicoat 828, Epicoat 1001, and dicyanediamine was used to prepare a laminate board. The bending strength of the resultant board was measured and was listed in Table 15.

TABLE 15

|  |  |  | Example | | | | Comparative |
|---|---|---|---|---|---|---|---|
|  |  |  | 93 | 94 | 95 | 96 | Example 53 |
| 1 | Viscosity (25° C. CPS) | | 196 | 181 | 193 | 205 | — |
| 2 | Volume Resistivity (30° C. Ω · cm) | | 6 × 10$^{15}$ | 1 × 10$^{15}$ | 4 × 10$^{15}$ | 2 × 10$^{15}$ | — |
| 3 | Bending Strength (kgf/mm$^2$) | 30° C. | 52 | 55 | 51 | 49 | 48 |
|  |  | 130° C. | 39 | 43 | 37 | 41 | 19 |
|  |  | Holding Percentage | 75 | 78 | 73 | 82 | 40 |

TABLE 15-continued

|  | Example | | | | Comparative |
|---|---|---|---|---|---|
|  | 93 | 94 | 95 | 96 | Example 53 |
| (%) | | | | | |

1 JIS C 2103
2 JIS C 2103
3 JIS C 6911

EXAMPLES 97–100

A liquid epi-bis type Epicoat 828 (available from Yuka shell Epoxy K.K.), a solid epi-bis type Epicoat 1001 (availabl®from Yuka Shell Epoxy K.K.), a middle viscosity liquid phenol-novolak EPN 1139, a solid O-cresol-novolak ESCN220L (avaiable from SUMITOMO CHEMICAL INDUSTRIES, LTD.) were used as eopxy resins. A CO resin (available from Takea Chemical Industries, LTD.) was used as a PBO. Vinirec E (available from Chisso K.K.), adipic acid, p-hydroxybenzoic acid, dioxane, and methanol were used as polyvinylformals. These materials were mixed at ratios shown in Table 16 and were stirred in a vessel equipped with a stirrer, a reflux condenser and the like and were uniformly dissolved at a temperature of 50° to 60° C. for one to two hours. The properties of the resultant dissolution type heat resistant epoxy resin composition are summarized in Table 16. The volume resistivities of these compositions were measured as follows. The samples were applied to aluminum plates and dried with air and were then cured at 150° C. for 15 hours. The resultant films had smooth, glossy surfaces. The test method complied with JIS C2103. Dielectric dissipation factors of the result samples were also measured in the same manner as described above. Bending strength measurement was performed as follows. The 0.18-mm thick glass clothes treated with amino silane were impregnated with the samples and were dried with air. The dried samples were further dried at 80° C. for 10 minutes to prepare prepregs. These prepregs had satisfactory flexibility and hardness after storage for 20 days. These prepregs were cut into 200 mm×200 mm pieces. Ten pieces were stacked and pressed at 150° C. and 40 kg/cm² for two hours. The resultant structures were cured at 150° C. for 15 hours to prepare laminate boards. The bending strengths of these laminate boards were measured according to a test method defined by JIS K6911, and the test results are summarized in Table 16.

The heat-resistant epoxy resin composition in Example 98 was applied to tape-like aligned glass roving pieces to obtain a bind tape containing 30% by weight of the resin and having a thickness of 0.3 mm and a width of 19 mm. When the tape was wound around a model defined by JIS C24121, the tape could be flexibly, easily wound therearound. A value in a ring model test was 812 kg.

TABLE 16

|  | | Example | | | |
|---|---|---|---|---|---|
|  | | 97 | 98 | 99 | 100 |
| Epicoat 828 | | 30.9 | 16.3 | 25.5 | 22.3 |
| Epicoat 1001 | | | | | 9.6 |
| EPN 1139 | | | 16.3 | | |
| ESCN 220L | | | | 6.4 | |
| PBO | | 6.2 | 7.2 | 6.4 | 7.0 |
| Adipic Acid | | | 0.7 | | 0.6 |
| P-hydroxybenzoate | | 0.6 | | 0.6 | |
| Polyvinylformaline | | 12.3 | 9.8 | 11.1 | 10.5 |
| Dioxane | | 34.9 | 34.9 | 35.0 | 35.0 |
| Methanol | | 15.1 | 15.0 | 15.0 | 15.0 |
| Nonvolatile fraction (wt %) | | 51.3 | 50.8 | 50.6 | 51.6 |
| Viscosity (cps/25° C.) | | 1340 | 1310 | 1470 | 1520 |
| Volume Resistivity ($\Omega \cdot cm$) | 25° C. | $1.1 \times 10^{16}$ | $1.5 \times 10^{16}$ | $1.6 \times 10^{16}$ | $1.3 \times 10^{16}$ |
|  | 180° C. | $6.0 \times 10^{14}$ | $1.2 \times 10^{16}$ | $9.0 \times 10^{14}$ | $7.0 \times 10^{14}$ |
| Dielectric Dissipation Factor (%) | 25° C. | 0.7 | 0.5 | 0.5 | 0.8 |
|  | 180° C. | 7.6 | 5.4 | 6.8 | 7.1 |
| Bending Strength (kg/mm²) | 25° C. | 62 | 67 | 65 | 59 |
|  | 180° C. | 31 | 41 | 36 | 33 |

EXAMPLES 101–110 & COMPARATIVE EXAMPLES 54–55

Bisphenol A-diglycidyl ether (Epicoat 828) and 2,2'-(1,3-phenylene)bis(2-oxazoline)(PBO) were used as epoxy resins. P-toluenesulfonic acid (PTS), p-hydroxybenzoic acid (PHS), adipic acid (AA), triphenylsilanol (TPS), and aluminumtriacetylacetonate (AlTA) were used as acid catalysts. In addition, ceramic fibers (Fiber Flux Milled Fiber (FFF) available from Toshiba Monoflux K.K.), silicon carbonate whiskers (SiCF: Tokamax available from Tokai Carbon K.K.), glass milled fibers (REV7 available from Nippon Sheet Glass Co., Ltd.), and Hidirights H-32 and H42M (available from Showa Keikinzoku K.K.) as aluminum hydroxide were used. Thesematerials were mixed at ratios shown in Table 17 and molded in molds at 150° C. for 15 hours to prepare samples. Fire retardancy, bending strength, cracking strength (Oriphant-Washer Method), and tracking resistance of these samples were evaluated and results are summarized in Table 17.

The compositions in Comparative Examples 54 and 55 were prepared such that an acid anhydride curing resin as a typical epoxy resin was used for the resin component.

TABLE 17

|  | Example | | | | | | | | | Comparative Example | |
|---|---|---|---|---|---|---|---|---|---|---|---|
|  | 101 | 102 | 103 | 104 | 105 | 106 | 107 | 108 | 110 | 54 | 55 |
| Epicoat 828 | 100 | 100 | 100 | 100 | 100 | 100 | 100 | 100 | 100 | 100 | 100 |
| PBO | 20 | 20 | 20 | 20 | 15 | 20 | 30 | 20 | 20 | (acidanhydride | 80 |
| PTS | 0.5 | — | — | — | — | — | — | — | 0.2 | HN2200) | |
| PHB | — | 3 | — | — | — | — | — | — | — | (Catalyst: | 0.5 |
| AA | — | — | 3 | — | 3 | 4 | 6 | 3 | — | benzyldi- | |

TABLE 17-continued

|  | Example | | | | | | | | | Comparative Example | |
|---|---|---|---|---|---|---|---|---|---|---|---|
|  | 101 | 102 | 103 | 104 | 105 | 106 | 107 | 108 | 110 | 54 | 55 |
| TPS/AlTA | — | — | — | 2/2 | — | — | — | — | — | methylamine) | |
| FFF | — | 150 | — | — | — | — | — | 50 | 50 | | |
| SiCF | 150 | — | — | — | — | — | — | — | — | | |
| REV 7 | — | — | 180 | 150 | 150 | 180 | 140 | 100 | 100 | 140 | — |
| Hydilite H32 | 180 | — | 180 | 150 | — | 80 | 140 | 150 | 160 | 180 | 140 |
| Hydilite H42M | — | 150 | 0 | 0 | 180 | 80 | — | — | — | — | — |
| Fire-Refardancy UL94-VO | o | o | o | o | o | o | o | o | o | o | x |
| Bending Strength (kgf/mm$^2$) | 16.8 | 16.7 | 17.5 | 17.3 | 16.4 | 17.3 | 15.8 | 15.5 | 15.6 | 12.2 | 10.8 |
| Tracking Resistance CTI: 600 V | Satisfactory | Satisfactory | Satisfactory | Satisfactory | Satisfactory | Satisfactory | Satisfactory | Satisfactory | Satisfactory | Satisfactory | Unsatisfactory |
| Cracking Resistance CI | 10 | 9.5 | >11 | >11 | >11 | 9.8 | 10 | >11 | 9.0 | 4 | 0 |

EXAMPLES 111–119 & COMPARATIVE EXAMPLES 56–63

Following the procedures of Examples 1–8, various components were mixed as indicated in Table 18 below and test samples were prepared. The evaluation results are set forth in Table 18.

TABLE 18

|  | Unit | Example 111 | | Example 112 | | Example 113 | | Example 114 | |
|---|---|---|---|---|---|---|---|---|---|
| Resin Composition | | | | | | | | | |
| Epicoat 826 | Parts by Volume | 100 | 81.9 | 100 | 81.9 | 100 | 81.9 | 100 | 78.7 |
| HN-2200 | | — | — | — | — | — | — | — | — |
| 2,2'-(1,3-phenylene)bis(2-oxazoline) | | | 16.4 | | 16.4 | | 16.4 | | 15.7 |
| Adipic Acid | | | 1.7 | | 1.7 | | 1.7 | | 5.6 |
| Bispenol A | | — | — | — | — | — | — | — | — |
| N,N—dimethylbenzylamine (DMBA) | | — | — | — | — | — | — | — | — |
| Filler | | | | | | | | | |
| Cut glass fiber (c) | | 138 | 69.0 | 138 | 80.4 | 138 | 99.7 | 80 | 66.0 |
| Silica (d) (average particle size: 0.98 μm) | | $\frac{c}{c+d} = 0.5$ | 69.0 | $\frac{c}{c+d} = 0.58$ | 57.6 | $\frac{c}{c+d} = 0.72$ | 38.3 | $\frac{c}{c+d} = 0.5$ | 66.0 |
| Silica (average particle size: 10.7 μm) | | — | | — | | — | | — | |
| Property | | | | | | | | | |
| Fluidity[1] | — | | ⊙ | | ⊙ | | ○ | | ⊙ |
| Cracking Resistance[2] | — | | >10 | | >10 | | >10 | | <10 |
| Thermal Deformation Temperature[3] | °C. | | 151 | | >170 | | >170 | | 136 |
| Tensile Strength[4] | kgf/mm$^2$ | | 14.3 | | 14.9 | | 15.9 | | 14.2 |
| Bending Strength[5] | kgf/mm$^2$ | | 23.4 | | 23.6 | | 24.8 | | 22.8 |
| Volume Resistivity[6] 160° C. | l-om | | $9.7 \times 10^{11}$ | | $9.7 \times 10^{11}$ | | $9.6 \times 10^{11}$ | | $7.2 \times 10^{11}$ |
| Dielectric Constant[7] 160° C. | T | | 5.4 | | 5.3 | | 5.4 | | 5.6 |
| Dielectric Dissipation Factor[8] | % | | 4.2 | | 4.1 | | 4.1 | | 3.8 |

|  | Unit | Example 115 | | Example 116 | | Example 117 | | Example 118 | |
|---|---|---|---|---|---|---|---|---|---|
| Resin Composition | | | | | | | | | |
| Epicoat 826 | Parts by Volume | 100 | 81.9 | 100 | 81.9 | 100 | 69.5 | 100 | 55.8 |
| HN-2200 | | — | — | — | — | — | — | — | — |
| 2,2'-(1,3-phenylene)bis(2-oxazoline) | | | 16.4 | | 16.4 | | 27.8 | | 40.2 |
| Adipic Acid | | | 1.7 | | 1.7 | | 2.7 | | 4.0 |
| Bispenol A | | — | — | — | — | — | — | — | — |
| N,N—dimethylbenzylamine (DMBA) | | — | — | — | — | — | — | — | — |
| Filler | | | | | | | | | |
| Cut glass fiber (c) | | | 40 | | 90 | 163.4 | 81.7 | 163.4 | 81.7 |
| Silica (d) (average particle size: 0.98 μm) | | $\frac{c}{c+d} = 0.5$ | 69.0 | $\frac{c}{c+d} = 0.5$ | 57.6 | $\frac{c}{c+d} = 0.5$ | 38.3 | $\frac{c}{c+d} = 0.5$ | 66.0 |
| Silica (average particle size: 10.7 μm) | | — | | — | | — | | — | |
| Property | | | | | | | | | |
| Fluidity[1] | — | | ⊙ | | ○ | | ⊙ | | ⊙ |

TABLE 18-continued

| | | | | | |
|---|---|---|---|---|---|
| Cracking Resistance[2] | — | 3 | >10 | >10 | >10 |
| Thermal Deformation Temperature[3] | °C. | 130 | >170 | 154 | 156 |
| Tensile Strength[4] | kgf/mm² | 12.2 | 14.2 | 14.4 | 14.2 |
| Bending Strength[5] | kgf/mm² | 20.2 | 23.0 | 23.4 | 22.8 |
| Volume Resistivity[6] 160° C. | l-om | $9.8 \times 10^{11}$ | $9.7 \times 10^{11}$ | $8.4 \times 10^{10}$ | $3.3 \times 10^{9}$ |
| Dielectric Constant[7] 160° C. | T | 5.4 | 5.5 | 6.9 | 7.8 |
| Dielectric Dissipation Factor[8] 160° C. | % | 4.3 | 4.2 | 7.7 | 10.7 |

| | Unit | Example 119 | | Comparative Example 56 | | 57 | | 58 | |
|---|---|---|---|---|---|---|---|---|---|
| Resin Composition | | | | | | | | | |
| Epicoat 826 | Parts by Volume | 100 | 93.8 | 100 | 81.9 | 100 | 81.9 | 100 | 55.5 |
| HN-2200 | | — | — | — | — | — | — | — | — |
| 2,2'-(1,3-phenylene)bis(2-oxazoline) | | — | 5.6 | — | 16.4 | — | 16.4 | — | — |
| Adipic Acid | | — | 0.6 | — | 1.7 | — | 1.7 | — | — |
| Bisphenol A | | — | — | — | — | — | — | — | — |
| N,N—dimethylbenzylamine (DMBA) | | — | — | — | — | — | — | — | 0.1 |
| Filler | | | | | | | | | |
| Cut glass fiber (c) | | 163.4 | 81.7 | 163.4 | 16.3 | 163.4 | 146.7 | 177 | — |
| Silica (d) (average particle size: 0.98 μm) | | $\frac{c}{c+d} = 0.5$ | 69.0 | $\frac{c}{c+d} = 0.1$ | 57.6 | $\frac{c}{c+d} = 0.9$ | 38.3 | | 66.0 |
| Silica (average particle size: 10.7 μm) | | — | | — | | — | | — | |
| Property | | | | | | | | | |
| Fluidity[1] | — | | | | | X | | | |
| Cracking Resistance[2] | — | | >10 | | <1 | | — | | 0 |
| Thermal Deformation Temperature[3] | °C. | | 170 | | 128 | | — | | 126 |
| Tensile Strength[4] | kgf/mm² | | 14.6 | | 12.4 | | — | | 8.4 |
| Bending Strength[5] | kgf/mm² | | 23.2 | | 17.6 | | — | | 15.4 |
| Volume Resistivity[6] 160° C. | l-om | | $8.3 \times 10^{11}$ | | $6.5 \times 10^{11}$ | | — | | $4.0 \times 10^{11}$ |
| Dielectric Constant[7] 160° C. | T | | 4.8 | | 5.5 | | — | | 6.1 |
| Dielectric Dissipation Factor[8] 160° C. | % | | 5.5 | | 4.2 | | — | | 3.2 |

| | Unit | Comparative Example 59 | | 60 | | 61 | | 62 | | 63 | |
|---|---|---|---|---|---|---|---|---|---|---|---|
| Resin Composition | | | | | | | | | | | |
| Epicoat 826 | Parts by Volume | 100 | 55.5 | 100 | 81.7 | 100 | 81.9 | 100 | 81.9 | 100 | 81.9 |
| HN-2200 | | — | 44.4 | — | — | — | — | — | — | — | — |
| 2,2'-(1,3-phenylene)bis(2-oxazoline) | | — | — | — | 16.4 | — | 16.4 | — | 16.4 | — | 16.4 |
| Adipic Acid | | — | 5.6 | — | 16.4 | — | 16.4 | — | | — | |
| Bisphenol A | | — | — | — | 1.9 | — | 1.7 | — | 1.7 | — | 1.7 |
| N,N—dimethylbenzylamine (DMBA) | | — | 0.1 | — | — | — | — | — | 0.1 | — | — |
| Filler | | | | | | | | | | | |
| Cut glass fiber (c) | | 93 | 46.5 | 76 | 76 | 115 | — | 210 | 105 | 30 | 15 |
| Silica (d) (average particle size: 0.98 μm) | | $\frac{c}{c+d} = 0.5$ | 46.5 | — | — | 115 | — | $\frac{c}{c+d} = 0.5$ | 105 | | 15 |
| Silica (average particle size: 10.7 μm) | | — | | — | | — | | — | | — | |
| Property | | | | | | | | | | | |
| Fluidity[1] | — | | ⊙ | | ○ | | ⊙ | | X | | ⊙ |
| Cracking Resistance[2] | — | | 8 | | <3 | | <1 | | — | | <1 |
| Thermal Deformation Temperature[3] | °C. | | 128 | | 122 | | 123 | | — | | 124 |
| Tensile Strength[4] | kgf/mm² | | 10.1 | | 9.3 | | 10.8 | | — | | 9.8 |
| Bending Strength[5] | kgf/mm² | | 16.3 | | 16.8 | | 17.6 | | — | | 17.2 |
| Volume Resistivity[6] 160° C. | l-om | | $4.2 \times 10^{11}$ | | $9.5 \times 10^{11}$ | | $9.6 \times 10^{11}$ | | — | | $9.8 \times 10^{11}$ |
| Dielectric Constant[7] 160° C. | T | | 6.0 | | 5.1 | | 5.3 | | — | | 5.5 |
| Dielectric Dissipation Factor[8] 160° C. | % | | 3.1 | | 4.3 | | 4.2 | | — | | 4.3 |

[1] Visual estimation
⊙ Excellent
○ Good
X Not castable
[2] Olyphant method (Kogyo Zairyo Vol. 129, No. 5, P-59, 1981)
[3]~[8] JISK 6911

As described above, the epoxy resin compositions of the present invention can provide cured products having good tenacity or toughness. The epoxy resin compositions of the present invention can be used not only for casting/molding, impregnation and lamination but also in fields requiring heat resistance and fire retardancy.

What is claimed is:

1. A curable epoxy resin composition, comprising an epoxy resin, and an oxazoline compound mixed in said epoxy resin, said composition forming, when cured, a polymer skeleton or structure comprising said epoxy resin and said oxazoline compound.

2. A composition according to claim 1, wherein the composition further contains a curing agent.

3. A composition according to claim 2, wherein the curing agent is at least one material selected from the group consisting of an organic acid, an organic acid anhydride, a sulfonate, an organic hydroxy compound, primary amine, and secondary amine.

4. A composition according to any one of claims 1 to 3, wherein the composition further contains a curing catalyst.

5. A composition according to claim 4, wherein the curing catalyst is at least one material selected from the group consisting of tertiary amine, heterocyclic amine, an imidazole compound, a boron trifluoride complex compound, a boron tetrafluoride amine salt, an aliphatic or alicyclic sulfonium salt, a quaternary ammonium salt, organosilane, and organosiloxane.

6. A composition according to claim 1, wherein the composition further contains a filler.

7. A composition according to claim 6, wherein the filler is at least one material selected from the group consisting of a fiber and an inorganic powder.

8. A composition according to claim 7, wherein the fiber is prepared in the form of roving, cloth, or nonwoven fabric.

9. A composition according to claim 1, wherein said oxazoline compound is selected from the group consisting of 1,2-bis(2-oxazolinyl-2)ethane; 1,4-bis(2-oxazolinyl-2)butane; 1,6-bis(2-oxazolinyl-2)hexane; 1,8-bis(2-oxazolinyl-2)octane; 1,4-bis(2-oxazolinyl-2)cyclohexane; 1,2-bis(2-oxazolinyl-2)benzene; 1,3-bis(2-oxazolinyl-2)benzene; 1,4-bis(2-oxazolinyl-2)benzene; 5,5'-dimethyl-2,2'-bis(2-oxazolinyl-2)benzene; 4,4',4'-tetramethyl-2,2'-bis(2-oxazolinyl-2)benzene; 1,3-bis(5-methyl-2-oxazolinyl-2)benzene; 1,4-bis(5-methyl-2-oxazolinyl-2)benzene; 2,2'-bis(2-oxazoline);2,2'-bis(4-methyl-2-oxazoline); and 2,2'-bis(5-methyl-2-oxazoline).

10. A composition according to claim 1, wherein said oxazoline compound is present in an amount of 0.1 to 1.2 equivalents of the oxazoline ring per equivalent of the oxirane ring of said epoxy resin.

11. The cured composition of claim 10.

12. The cured composition of claim 10.

* * * * *